United States Patent [19]

Kobayashi et al.

[11] Patent Number: 5,355,220
[45] Date of Patent: Oct. 11, 1994

[54] OPTICAL MOVEMENT MEASURING METHOD AND APPARATUS USING INTERFERENCE FRINGES GENERATED BY OVERLAPPING SPOTS OF DIFFRACTED LIGHTS OF DIFFERENT ORDERS OF DIFFRACTION FROM A LINE SOURCE

[75] Inventors: Hiroshi Kobayashi, No.3-15, Hanakoganei, Kodaira-Shi; Haruhiko Machida, No.4-10-7, Nakaochiai, Shinjuku-Ku, Tokyo; Jun Akedo, Tokyo; Tomoyuki Yamaguchi, Chiba; Hiroyoshi Funato, Chigasaki, all of Japan

[73] Assignees: Ricoh Company, Ltd.; Hiroshi Kobayashi; Haruhiko Machida, all of Tokyo, Japan

[21] Appl. No.: 931,511

[22] Filed: Aug. 21, 1992

Related U.S. Application Data

[63] Continuation of Ser. No. 724,483, Jun. 28, 1991, abandoned, which is a continuation of Ser. No. 435,977, Nov. 13, 1989, abandoned.

[51] Int. Cl.$^5$ .............................................. G01B 9/02
[52] U.S. Cl. ................... 356/356; 250/237 G
[58] Field of Search ........................... 356/356, 363; 250/237 G, 231.16

[56] References Cited

U.S. PATENT DOCUMENTS

| 3,419,330 | 12/1968 | Schneider . |
| 3,726,595 | 4/1973 | Matsumoto . |
| 4,218,615 | 8/1980 | Zinn, Jr. ......................... 250/237 G |
| 4,395,124 | 7/1983 | Remijan ............................. 356/356 |
| 4,823,001 | 4/1989 | Kobayashi et al. . |
| 4,912,322 | 3/1990 | Ichikawa ......................... 250/237 G |

FOREIGN PATENT DOCUMENTS

| 0216159 | 4/1987 | European Pat. Off. . |
| 0254823 | 2/1988 | European Pat. Off. . |
| 3904898 | 2/1989 | Fed. Rep. of Germany . |
| 23617 | 8/1975 | Japan . |
| 47616 | 2/1988 | Japan . |
| 8603833 | 7/1986 | PCT Int'l Appl. . |
| 970845 | 8/1964 | United Kingdom . |
| 1138082 | 12/1968 | United Kingdom . |
| 1431067 | 4/1976 | United Kingdom . |
| 1474049 | 5/1977 | United Kingdom . |
| 2187282 | 8/1987 | United Kingdom . |

OTHER PUBLICATIONS

Akedo et al., "Point Source Diffraction and its Use in an Encoder", Applied Optics, vol. 27, No. 22, Nov. 15, 1988.
Akedo et al., "Studying of a Laser Encoder by Using a Point Source Diffraction", Material of the 8th Meeting of the Society for the Study of Robot Engineering, Mar. 3, 1989.
Akedo et al., "Formation of a Diffractional Grating by Magnetic Lithograph", Nippon Oyo Jiki Gakkaishi, vol. 13, No. 2, 1989.

Primary Examiner—Samuel A. Turner
Attorney, Agent, or Firm—Oblon, Spivak, McClelland, Maier & Neustadt

[57] ABSTRACT

An optical movement measuring method and apparatus measures a movement of an object. A light from a light source is irradiated on a diffraction grating which is provided on the object so as to generate diffracted lights of different order of diffraction. The diffraction grating has light transmitting portions and light blocking portions which are alternately and periodically arranged. Interference fringes which comprises bright and dark stripes which occur alternately and are generated by overlapping spots of diffracted lights of different order of diffraction are detected, and a movement of the object is measured based on a counted number of stripes of the detected interference fringes.

64 Claims, 20 Drawing Sheets

FIG. IA
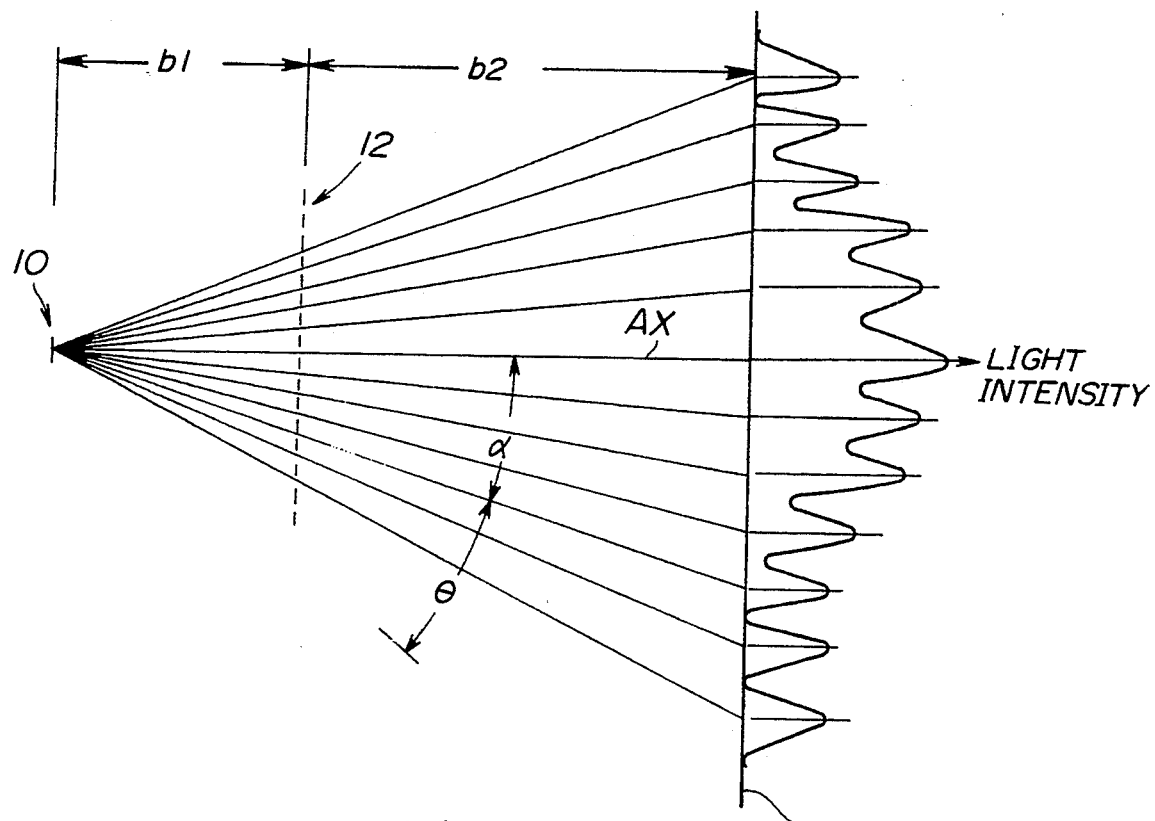
FIG. IB
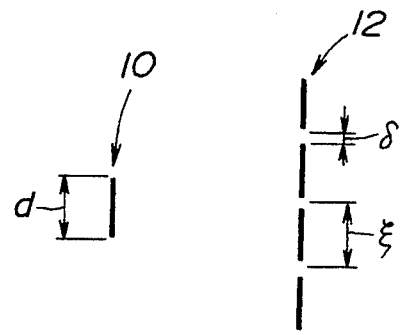

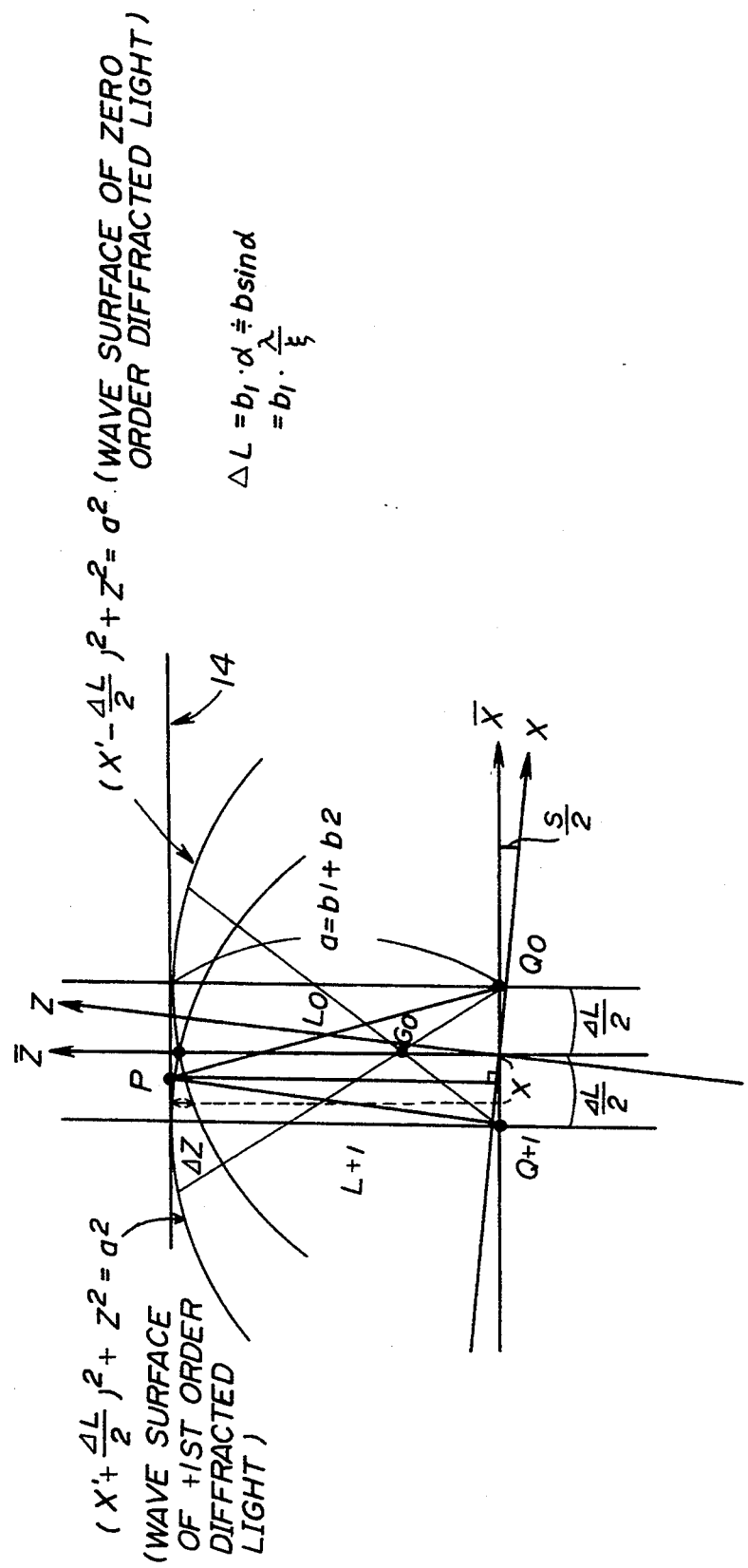

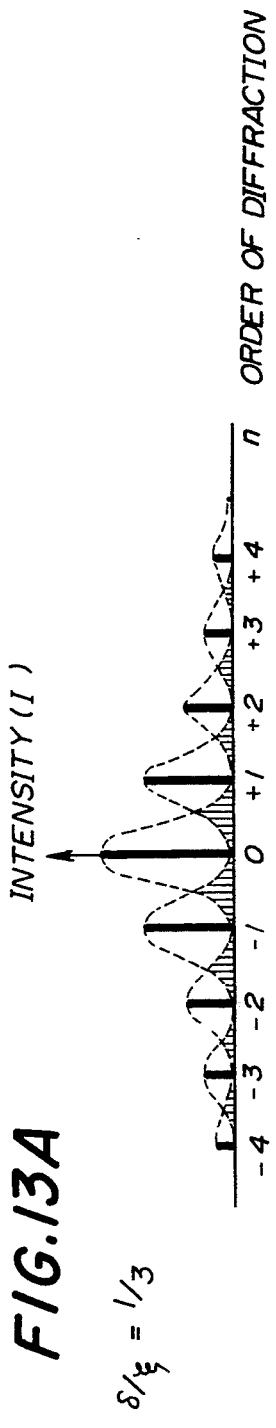
FIG.13A  δ/ξ = 1/3
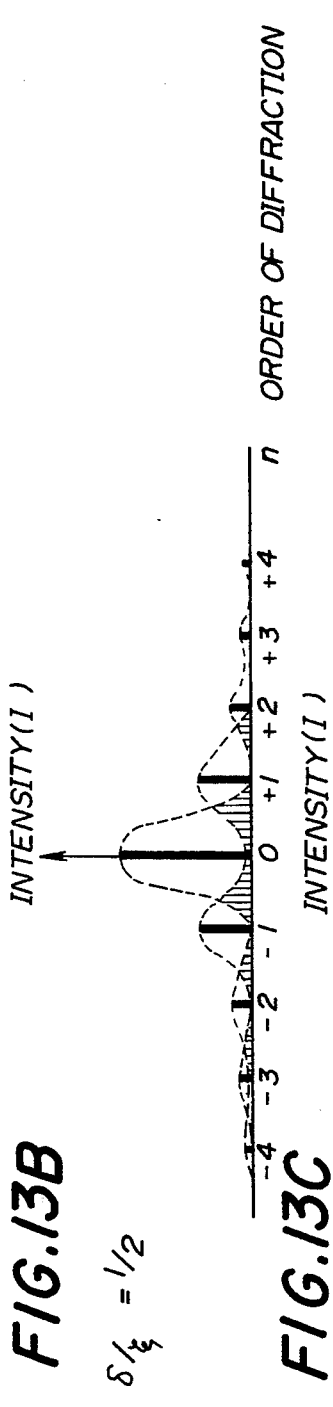
FIG.13B  δ/ξ = 1/2
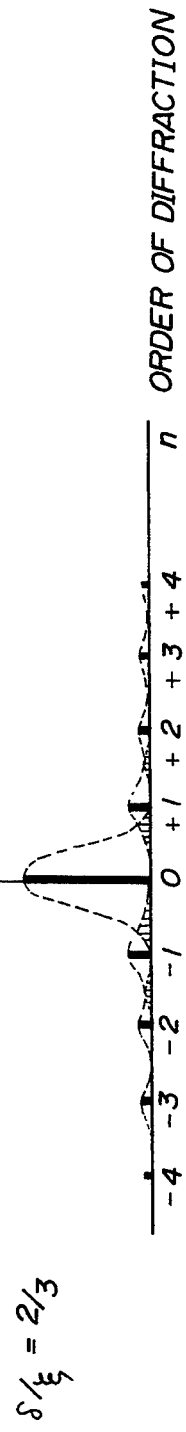
FIG.13C  δ/ξ = 2/3
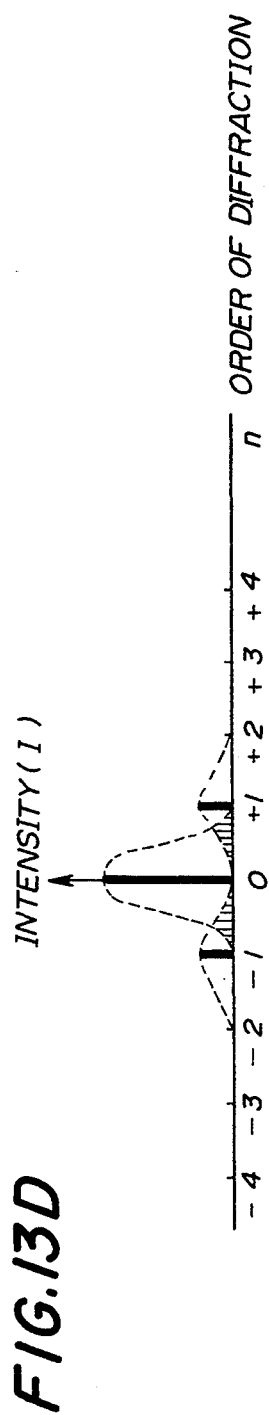
FIG.13D

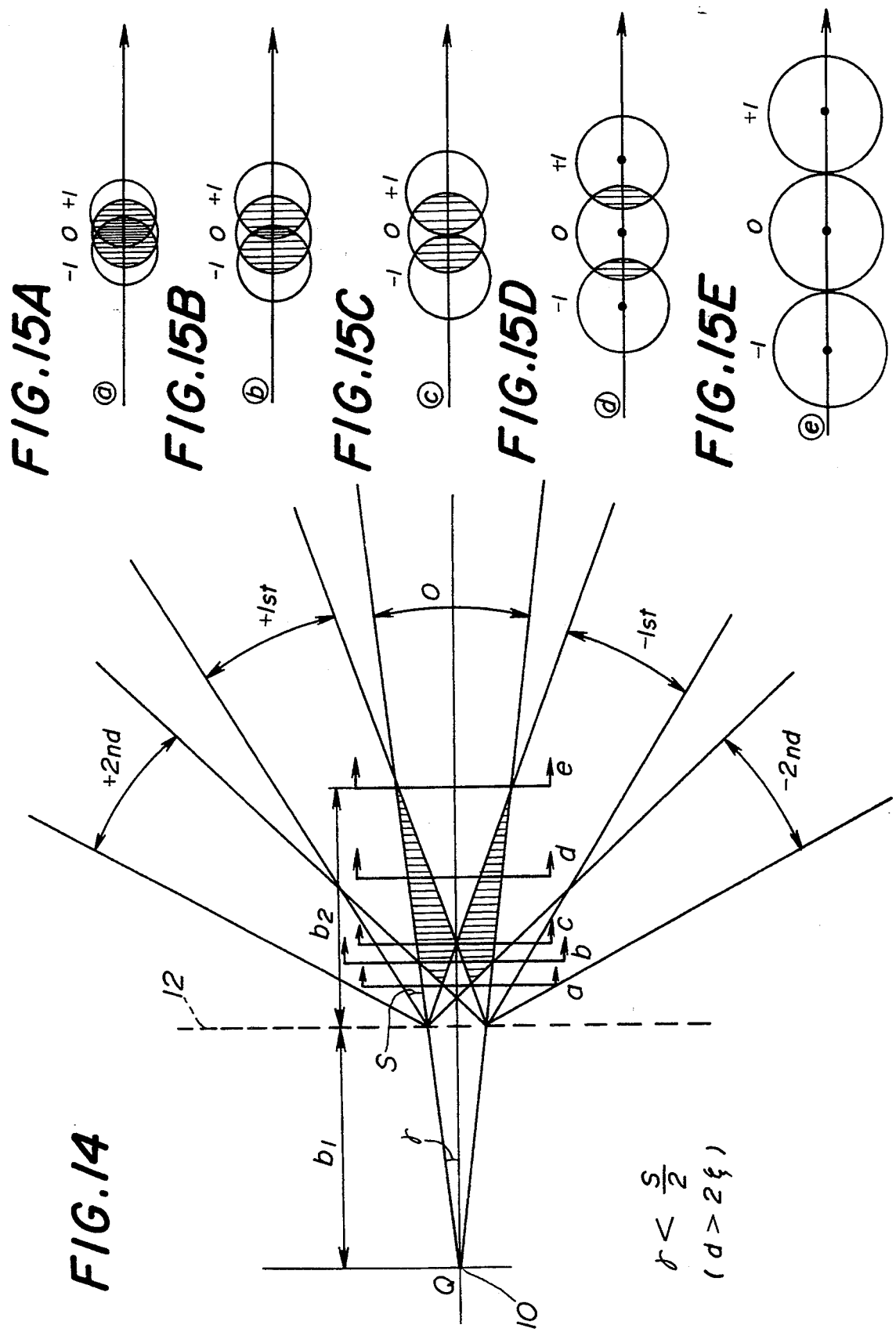

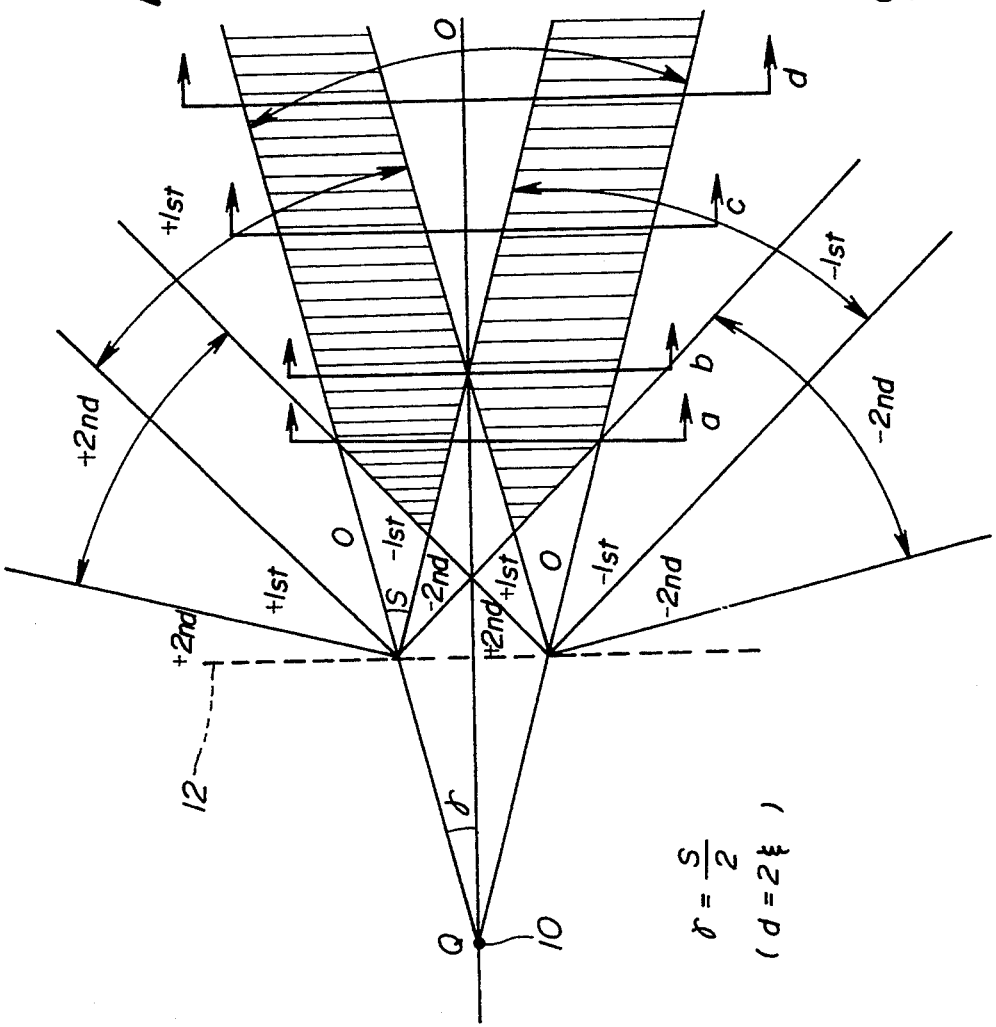
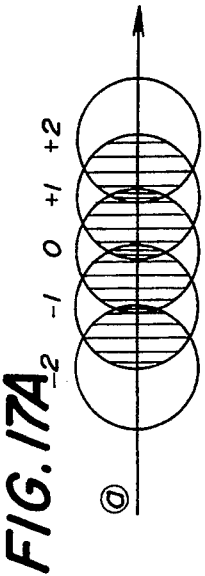
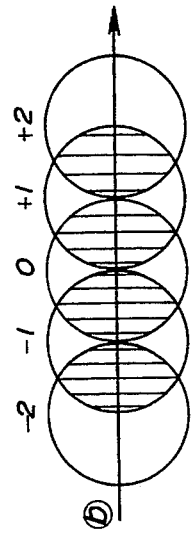
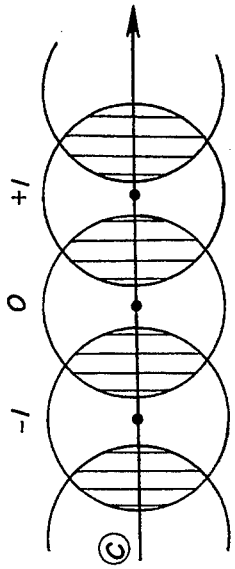
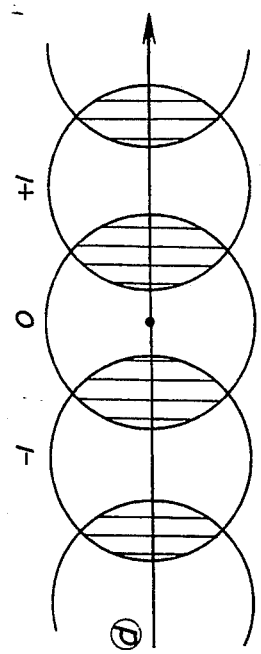

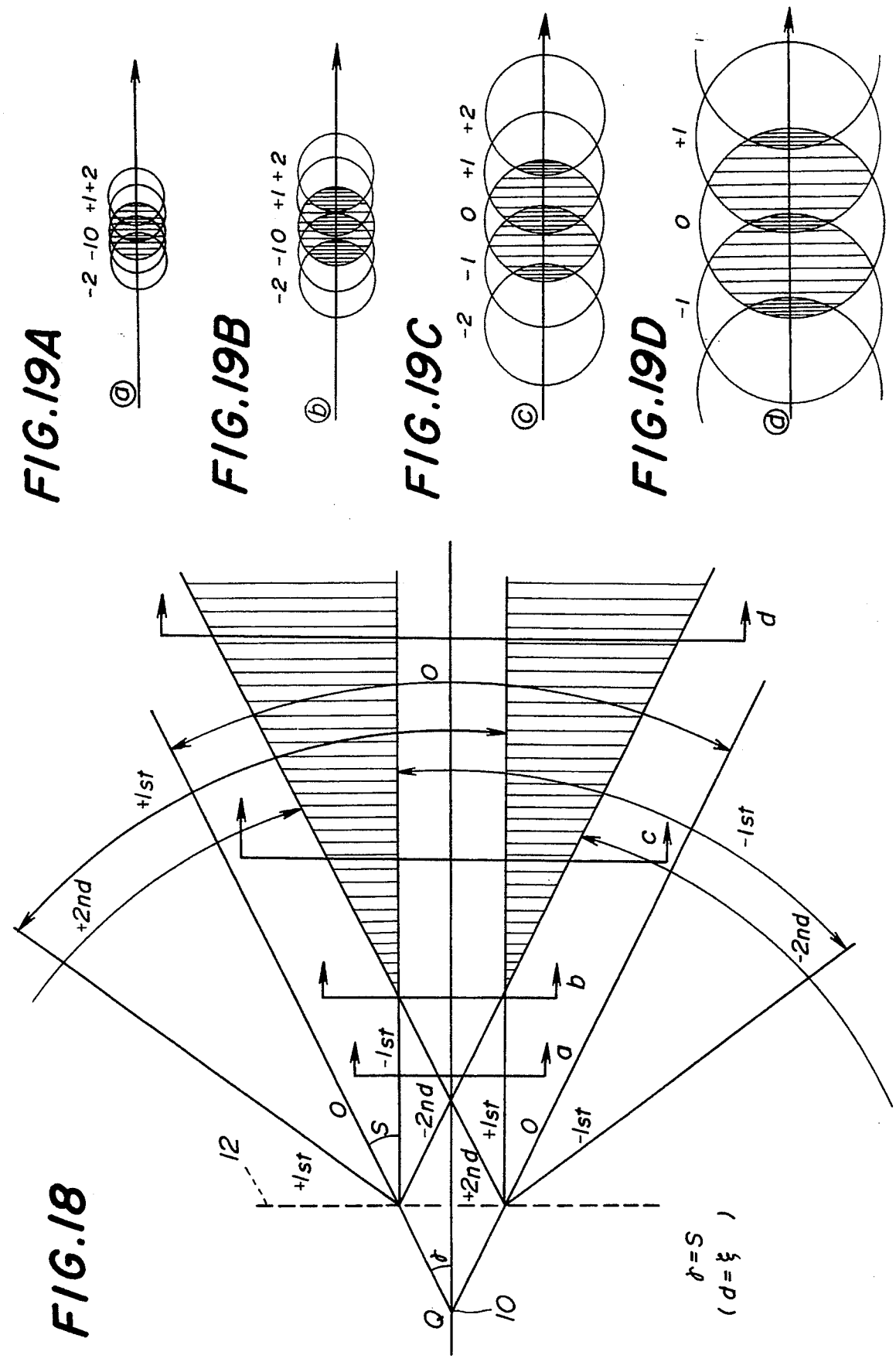

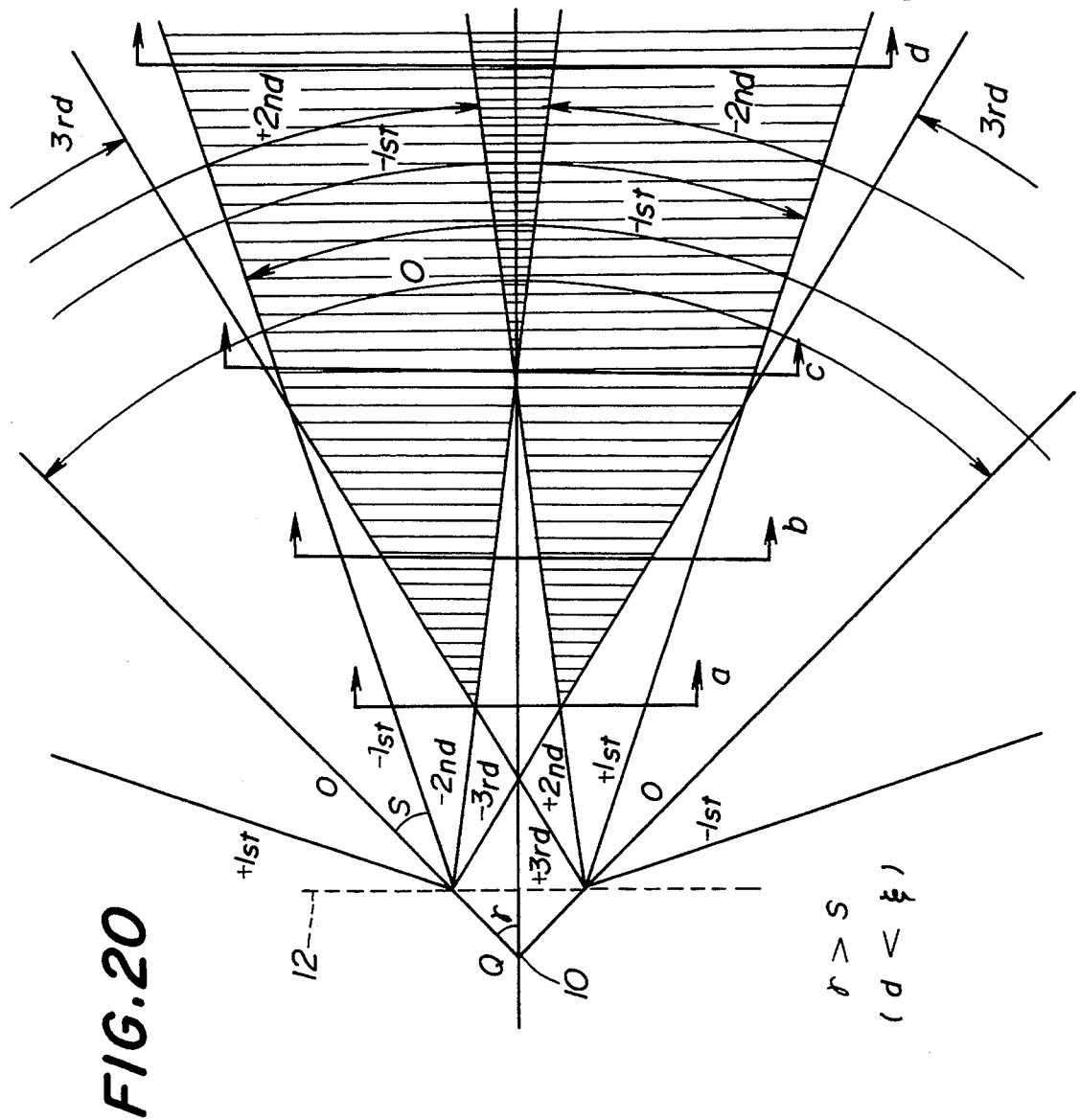

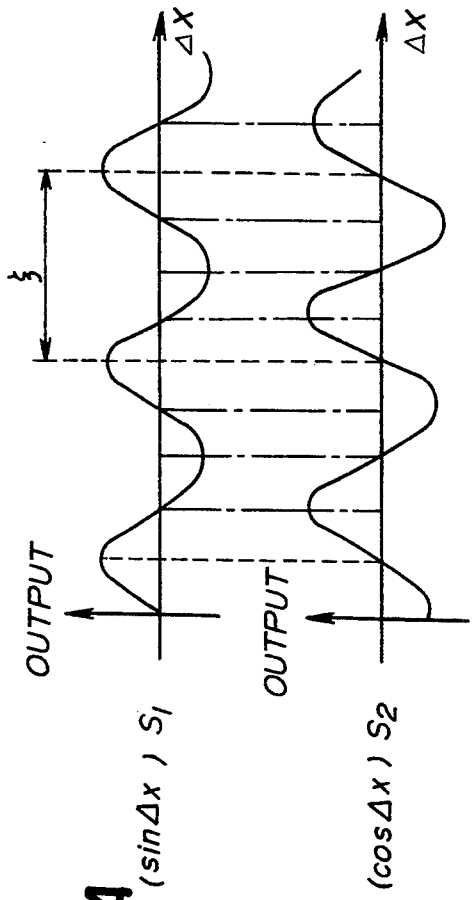
FIG.24A (sin Δx) S₁
FIG.24B (cos Δx) S₂
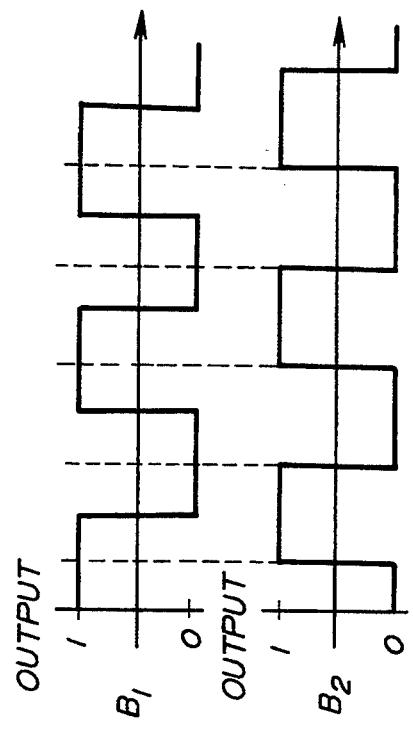
FIG.25A
FIG.25B

OPTICAL MOVEMENT MEASURING METHOD AND APPARATUS USING INTERFERENCE FRINGES GENERATED BY OVERLAPPING SPOTS OF DIFFRACTED LIGHTS OF DIFFERENT ORDERS OF DIFFRACTION FROM A LINE SOURCE

This application is a continuation of application Ser. No. 07/724,483, filed on Jun. 28, 1991 and of application Ser. No. 07/435,977, filed on Nov. 13, 1989, both now abandoned.

BACKGROUND OF THE INVENTION

The present invention generally relates to optical movement measuring methods and apparatuses, and more particularly to an optical movement measuring method which is applicable to various encoders and the like for measuring micromovements or microdisplacements and an optical movement measuring apparatus which employs this optical movement measuring method.

It is known to irradiate a light which is emitted from a light source onto an object and detect a position of the object by detecting a reflected light or a transmitted light from the object using a photodetector.

A method of optically measuring a movement of an object was proposed in a Japanese Laid-Open Patent Application No. 63-47616. According to this proposed method, an object having a periodic structure is illuminated by a divergent bundle of rays emitted from a monochromatic point light source so as to generate a shadow diffraction pattern which corresponds to the periodic structure of the object. A photodetector detects a movement of the object by detecting a movement of the shadow diffraction pattern which moves as the object moves in a direction traversing the divergent bundle of rays.

However, this proposed method suffers the following problems. That is, as is clear from a logical analysis disclosed in the Japanese Laid-Open Patent Application No. 63-47616, it is necessary to realize a predetermined positional relationship among the point light source, the object and the photodetector in order to generate the shadow diffraction pattern. When this positional relationship changes, the generated shadow diffraction pattern also changes. This means that the shadow diffraction pattern changes and an error is introduced in the measured movement when the positional relationship changes for some reason or simply changes with time.

SUMMARY OF THE INVENTION

Accordingly, it is a general object of the present invention to provide a novel and useful optical movement measuring method and apparatus in which the problems described above are eliminated.

Another and more specific object of the present invention is to provide an optical movement measuring method for measuring a movement of an object, comprising the steps of irradiating a coherent light from a light source on a diffraction grating which is provided on the object so as to generate diffracted lights of different order of diffraction, where the diffraction grating has light transmitting portions and light blocking portions which are alternately and periodically arranged or has light reflecting portions and non-reflecting portions which are alternately and periodically arranged, detecting interference fringes which are generated by overlapping spots of diffracted lights of different order of diffraction, where the interference fringes comprise bright and dark stripes which occur alternately, and measuring a movement of the object based on a counted number of stripes of the detected interference fringes. According to the method of the present invention, it is possible to detect a micromovement or microdisplacement of the object with an extremely high accuracy.

Still another object of the present invention is to provide an optical movement measuring apparatus for measuring a movement of an object, comprising a light source for emitting a coherent light, a diffraction grating which is provided on the object so as to generate diffracted lights of different order of diffraction when irradiated by the coherent light emitted from the light source, where the diffraction grating has light transmitting portions and light blocking portions which are alternately and periodically arranged or has light reflecting portions and non-reflecting portions which are alternately and periodically arranged, detector means for detecting interference fringes which are generated by overlapping spots of diffracted lights of different order of diffraction, where the interference fringes comprise bright and dark stripes which occur alternately, and means responsive to an output of the detector means for measuring a movement of the object based on a counted number of stripes of the detected interference fringes. According to the apparatus of the present invention, it is possible to measure a micromovement or microdisplacement of the object with an extremely high accuracy by a simple structure.

Other objects and further features of the present invention will be apparent from the following detailed description when read in conjunction with the accompanying drawings.

BRIEF DESCRIPTION OF THE DRAWINGS

FIGS. 1A and 1B are diagrams for explaining a shadow diffraction pattern;

FIGS. 10 and 11 respectively are diagrams for explaining a light intensity distribution when a distance between a light source and a diffraction grating is approximately the same as a distance between the diffraction grating and a screen or when a pitch of slits of the diffraction grating is small;

FIGS. 13A through 13D respectively show light intensity distributions for explaining effects of the characteristic of the diffraction grating on the interference fringes;

FIG. 14 is a diagram showing diffracted lights for a case where $\gamma < S/2$;

FIGS. 15A through 15E respectively show diffraction spots formed at various distances from the diffraction grating in FIG. 14;

FIG. 16 is a diagram showing diffracted lights for a case where $\gamma = S/2$;

FIGS. 17A through 17D respectively show diffraction spots formed at various distances from the diffraction grating in FIG. 16;

FIG. 18 is a diagram showing diffracted lights for a case where $\gamma = S$;

FIGS. 19A through 19D respectively show diffraction spots formed at various distances from the diffraction grating in FIG. 18;

FIG. 20 is a diagram showing diffracted lights for a case where $\gamma > S$;

FIGS. 21A through 21D respectively show diffraction spots formed at various distances from the diffraction grating in FIG. 20;

FIGS. 24A and 24B respectively show signal waveforms of signals output from amplifiers shown in FIG. 22;

FIGS. 25A and 25B respectively show signal waveforms of digital signals output from analog-to-digital converters shown in FIG. 22;

DESCRIPTION OF THE PREFERRED EMBODIMENTS

Figure 2:
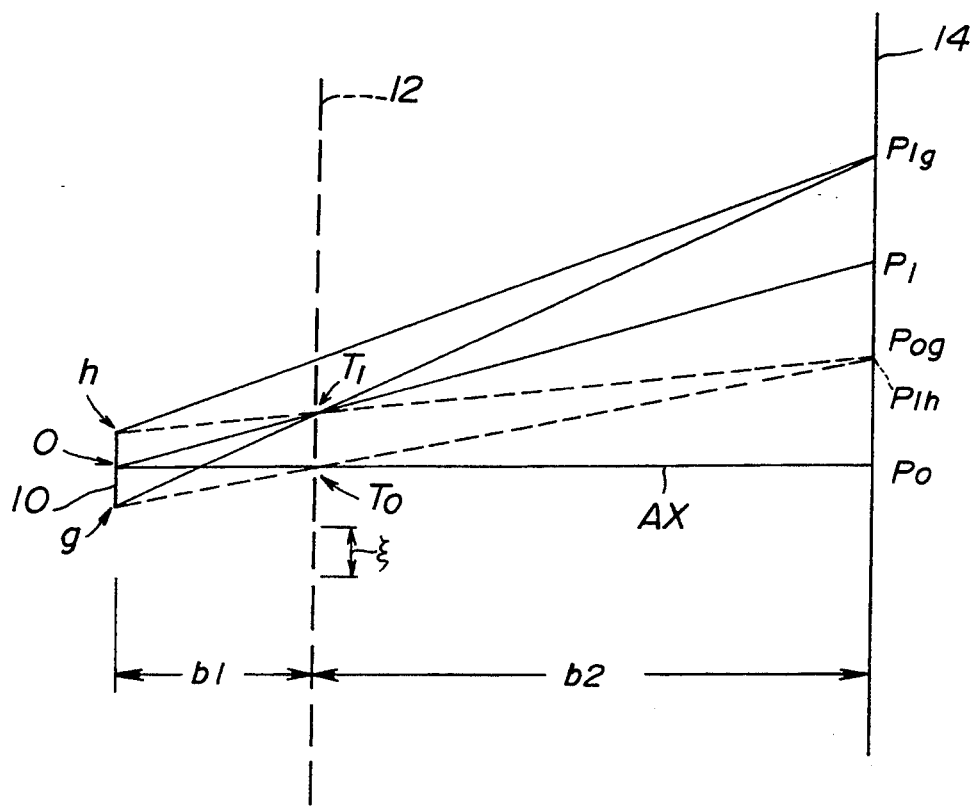
FIG. 2 is a diagram for explaining a generation of a shadow diffraction pattern in a vicinity of an optical axis.

First, a description will be given of a "shadow diffraction pattern" so as to facilitate the understanding of the present invention. The term "shadow diffraction pattern" may be found in the Japanese Laid-Open Patent Application No. 63-47616 referred above, and refers to a periodic stripe pattern in which bright and dark patterns alternately exist. The shadow diffraction pattern is generated by a diffraction. The periodic structure of the shadow diffraction pattern and the periodic structure of the object have a certain relationship but the shadow diffraction pattern is not a shadowgraph of the periodic structure of the object.

In this specification, the shadow diffraction pattern which is a shadowgraph of the periodic structure of the object will be referred to as a shadow pattern or interference fringes. In addition, a light source having a finite length will be referred to as a finite line source. For example, a rectangular light emitting portion of a laser diode along a longitudinal direction may be used as the finite line source.

Next, a description will be given of an operating principle of the optical movement measuring method according to the present invention. FIG. 1A shows a finite line source 10, a diffraction grating 12, and a screen 14. The finite line source 10 has a length d as shown in FIG. 1B. As shown in FIG. 1B, slits of the diffraction grating 12 are provided with a pitch $\xi$, and each slit has a width $\delta$. On the other hand, as shown in FIG. 1A, the finite line source 10 and the diffraction grating 12 confront each other with a distance b1 formed therebetween, while the diffraction grating 12 and the screen 14 confront each other with a distance b2 formed therebetween. The slit of the diffraction grating 12 corresponds to a light transmitting portion, and a portion of the diffraction grating 12 between two successive slits corresponds to a light blocking portion.

When a light intensity distribution on the screen 14 is observed, a pattern of strong and weak light intensities appears on the screen as shown in FIG. 1A. In the arrangement shown in FIG. 1A, a longitudinal direction of the finite line source 10 is parallel to a direction in which slits (gratings) of the diffraction grating 12 are arranged. This direction in which the slits of the diffraction grating 12 are arranged is also parallel to the screen 14. An imaginary perpendicular line is drawn from a center of the finite line source 10 along the longitudinal direction, and this perpendicular line is referred to as an optical axis AX.

When positions of peaks in the light intensity distribution on the screen 14 are observed, these positions correspond to positions where each ray passing through a slit of the diffraction grating 12 hits the screen 14 when a light which is emitted from the center portion of the finite line source 10 along the longitudinal direction is regarded as rays. Accordingly, when the finite line source 10 is simply regarded as a point light source and a slit distribution of the diffraction grating 12 is projected on the screen 14 as a shadowgraph using the point light source, the light intensity distribution described above corresponds to this shadowgraph of the slit distribution. For this reason, the light intensity distribution is referred to as the shadow pattern. However, this shadow pattern is obtained as a result of the diffraction phenomenon and is of course not a simple shadow phenomenon. This is evident from the fact that the light intensity in the light intensity distribution is large in a vicinity of the optical axis AX and is small at locations distant from the optical axis AX.

Next, a description will be given of the characteristics of the shadow pattern. When the value $d/\xi$ becomes greater than 2, that is, when the length d of the finite line source 10 becomes greater than twice the pitch $\xi$ of the slits of the diffraction grating 12, it is impossible to obtain a shadow pattern which has a satisfactory contrast. On the other hand, when the value $d/\xi$ becomes small and approaches 0, the shadow pattern which is obtained conforms to the generating conditions for generating the shadow diffraction pattern disclosed in the Japanese Laid-Open Patent Application No. 63-47616. In other words, when the value $d/\xi$ becomes smaller than 1/10, the finite line source 10 acts as if it were a point light source and the shadow pattern becomes sensitive and unstable with respect to changes in the distances b1 and b2.

When the width $\delta$ is comparable in size to the pitch $\xi$ such as a case where the width $\delta$ is in the order of $\xi/3$, the contrast of the shadow pattern becomes poor and the photodetector cannot satisfactorily detect the contrast. Accordingly, in this specification, when it is said that the width $\delta$ is sufficiently small compared to the pitch $\xi$ of the periodic structure of the object, this means that width $\delta$ of the light transmitting part or the light reflecting part is such that the generated shadow pattern has a contrast which is sufficiently measurable by the photodetector.

In the shadow pattern itself, the light intensity is large in the vicinity of the optical axis AX and becomes smaller as the position becomes more distant from the optical axis AX. In other words, the light intensity is large in an angular range $\pm \alpha$, where the angle $\alpha$ is formed between the optical axis AX and a straight line originating from the central portion of the finite line source 10 along the longitudinal direction. On the other hand, in an angular range $\theta$ outside the angular region $\pm \alpha$, the light intensity is stabilized and the contrast of the shadow pattern is high. But in the angular region $\pm \alpha$, the light intensity is large even at the low intensity portion and the contrast of the shadow pattern is not very high.

Next, a description will be given of the relationship between the size of the shadow pattern and the pitch $\xi$ of the slits of the diffraction grating 12. It is clear from the corresponding relationship between the shadow pattern and the periodic structure of the diffraction grating 12 that a distance between two successive peaks in the shadow pattern is $\xi \cdot (1+b2/b1)$. According to experiments conducted by the present inventors, it was found that the relationship between the pitch $\xi$ and the distance $\xi \cdot (1+b2/b1)$ between two successive peaks of the shadow pattern stands for a considerably large range of values for the distances b1 and b2. The inventors were unable to arrive at a circumstance where this relationship no longer stands. From the experimental results, it was found that the shadow pattern is extremely stable and the size of the shadow pattern can be appropriately set within a considerably large range by the values of the pitch $\xi$ and the distance $\xi \cdot (1+b2/b1)$ between the two successive peaks of the shadow pattern.

The shadow pattern will now be analyzed theoretically. A description will be given of the generation mechanism of the shadow pattern in the vicinity of the optical axis AX, by referring to FIG. 2. In FIG. 2, it is assumed that $b1 < < b2$ and that a row of diffraction spots is generated on the screen 14 in correspondence with the arrangement of the light transmitting portions of the diffraction grating 12 when a point light source is placed at the position of the finite line source 10. Under these conditions, the finite line source 10 is regarded as a linear arrangement of contiguous point light sources. As shown in FIG. 2, an upper end, a lower end and a center of the finite line source 10 are respectively denoted by h, g and o. In this case, out of the diffraction spots generated by the arrangement of the point light source on a line segment og, the diffraction spots corresponding to a slit T0 of the diffraction grating 12 are generated between points P0 and Pog on the screen 14 and the light intensity distributions of these diffraction spots overlap each other. Accordingly, when it is assumed that the light intensity of the finite line source 10 is constant for the length d, the illuminance between the points P0 and Pog on the screen 14 is substantially uniform in correspondence with the line segment og. Similarly, out of the diffraction spots generated by the arrangement of the point light source on the line segment og, the diffraction spots corresponding to a slit T1 of the diffraction grating 12 are generated between points P1 and P1g on the screen 14 and the light intensity distributions of these diffraction spots overlap each other. Thus, when it is assumed that the light intensity of the finite line source 10 is constant for the length d, the illuminance between the points P1 and P1g on the screen 14 is substantially uniform in correspondence with the line segment og. A continuous illuminance distribution in which the diffraction spots overlap as described above is referred to as a spread of the diffraction spot.

Furthermore, when the diffraction spots generated by the arrangement of the point light source on a line segment oh are considered, the diffraction spots corresponding to the slit T1 of the diffraction grating 12 are generated between points Pog and P1 on the screen 14 and the light intensity distributions of these diffraction spots overlap each other. Thus, when it is assumed that the light intensity of the finite line source 10 is constant for the length d, the illuminance between the points Pog and P1 on the screen 14 is substantially uniform in correspondence with the line segment oh. When determining the conditions under which the shadow pattern is generated, it is necessary to consider how the spread of the diffraction spots generated by the line segment og of the finite line source 10 and the spread of the diffraction spots generated by the line segment oh of the finite line source 10 overlap each other.

When the pitch $\xi$ is slightly greater than the length d, the spread of the diffraction spots occur in vicinities of the points P0, Pog, P1 and the like in FIG. 2. Hence, the illuminance is large at portions in vicinities of the points P0, Pog, P1 and the like. It can thus be regarded that there is no spread of the diffraction spot at portions such as between the points P0 and Pog and between the points Pog and P1 where the illuminance has the original illuminance of the spread of the diffraction spots and the illuminance is large at the portion where the spreads of the diffraction spots overlap each other, and further, that the light intensity distribution such as that within the angular range $\pm\alpha$ shown in FIG. 1A is obtained. As is clear from the above described theory, the spreads of the diffraction spots are mutually separated on the screen 14 when the pitch $\xi$ is larger than the length d and it is possible to obtain the shadow pattern with a clear or high contrast. But when the ratio $d/\xi$ becomes approximately 1/10 or less, the finite line source 10 begins to show characteristics of a point light source and it no longer becomes possible to obtain a stable shadow pattern for the various values of the distances b1 and b2.

In addition, when the length d becomes greater than twice the pitch $\xi$, the overlap of the spreads of the diffraction spots becomes large, and the contrast of the shadow pattern rapidly deteriorates.

When the pitch $\xi$ is equal to the length d, the spreads of the diffraction spots are continuous in the illuminance distribution on the screen 14 and a shadow pattern having a satisfactory contrast cannot be obtained according to the considerations described above. However, if the luminance distribution of the finite line source 10 is such that the illuminance is large at the center and smaller towards the two ends, it is possible to obtain a stable shadow pattern because the spread of the diffraction spots itself due to each slit of the diffraction grating 12 becomes an illumination distribution which is in accordance with the luminance distribution of the finite line source 10. In this case, the results obtained from the experiments conform to this consideration when the effective length of the finite line source 10 is regarded as a half-width of the luminance distribution.

Figure 3:
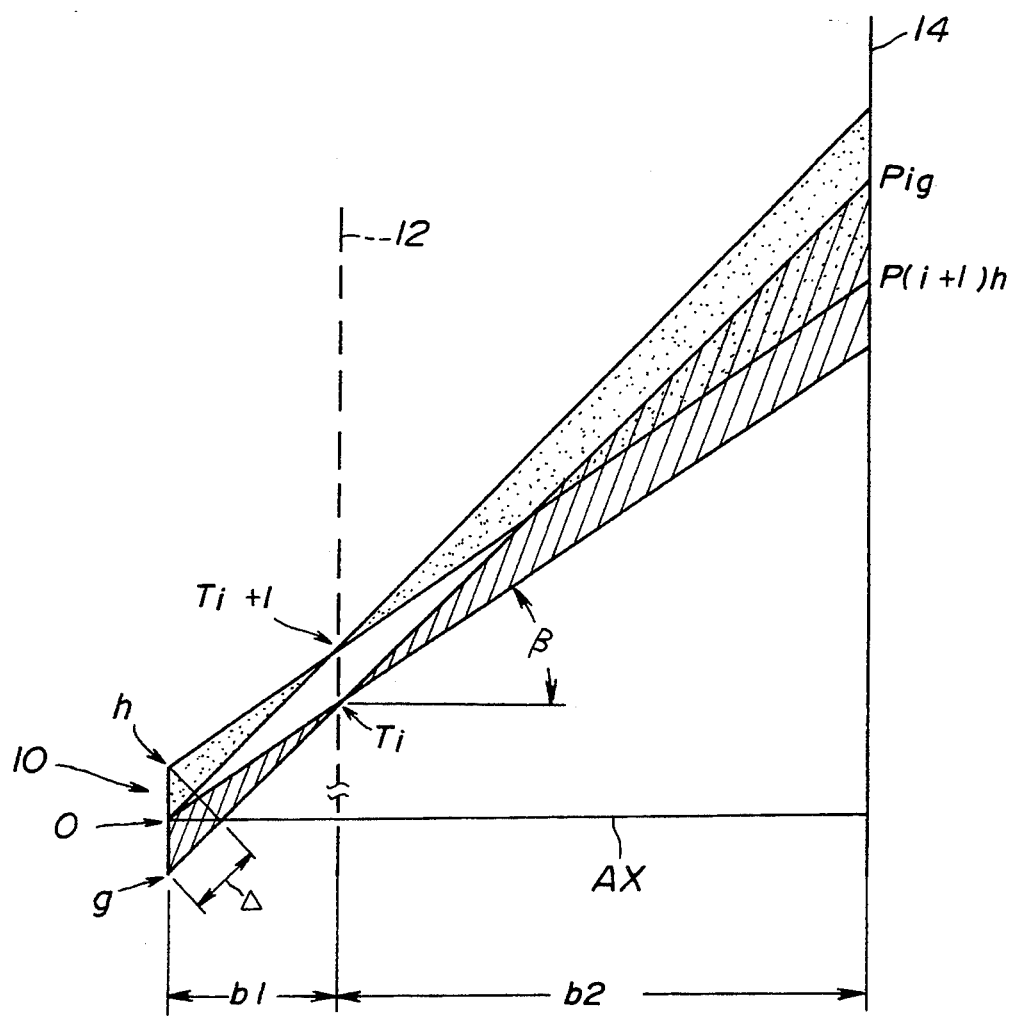
FIG. 3 is a diagram for explaining a generation of a shadow diffraction pattern at a location distant from the optical axis.

Next, a description will be given of a shadow pattern which is obtained at a portion distant from the optical axis AX, by referring to FIG. 3. In FIG. 3, it is assumed that the length d is greater than the pitch $\xi$ and the spread of the diffraction spots generated on the screen 14 by the light from the line segment og of the finite line source 10 through a slit Ti and the spread of the diffraction spots generated on the screen 14 by the light from the line segment oh of the finite line source 10 through a slit Ti+1 overlap each other in a region P(i+1)hPig. Since the light which reaches the screen 14 from the center of the finite line source 10 forms an angle $\beta$ to the optical axis AX, it is necessary to consider a phase difference between the light from the end portion g and the light from the end portion h of the finite line source 10 in the region P(i+1)hPig due to the difference in optical paths between the region P(i+1)hPig and the two end portions g and h.

When it is assumed that $b1<<b2$ and $b1>>\lambda$, where $\lambda$ denotes the wavelength, a difference $\Delta$ between the line segment gTiPig and the line segment hTi+1P(i+1)h can be approximated as $\Delta = d \cdot \sin\beta$. When the difference $\Delta$ is regarded as the difference in optical paths, a phase difference $\phi$ which is generated by this difference in the optical paths can be described by $\phi = 2\pi \cdot \Delta/\lambda$. Accordingly, when the phase difference $\phi$ is slightly larger than $\pi$, the phase difference is $\pi$ somewhere in the region P(i+1)hPig on the screen 14 and the light intensity is small at such a portion due to the interference. In this case, even when the length d is approximately twice the pitch $\xi$, the shadow pattern (interference fringes) of bright and dark portions is generated due to the interference. When a laser diode having the length $d=3$ μm and the wavelength $\lambda=0.78$ μm is used as the finite line source 10 with respect to the diffraction grating 12 having the slits with the pitch $\xi=1.8$ μm, it was confirmed from experiments that the angle $\alpha$ shown in FIG. 1A is approximately 10° and the angle $\theta$ is approximately 5°. That is, the angular range in which a shadow pattern with a stable contrast is obtained was approximately 5°. When the angle $\theta$ becomes greater than 5°, the contrast of the shadow pattern rapidly deteriorates.

When the length d and the wavelength $\lambda$ of the laser diode are used to calculate an angle $\beta1$ at which the phase difference $\phi$ becomes equal to $\pi$, the angle $\beta1=7.47°$. Similarly, when an angle $\beta2$ at which the phase difference $\phi$ becomes equal to $2\pi$ is calculated, the angle $\beta2=15.07°$. It can thus be regarded that the angles $\beta1$ and $\beta2$ in FIG. 3 correspond to the angle $\theta$ shown in FIG. 1A.

Figure 4:
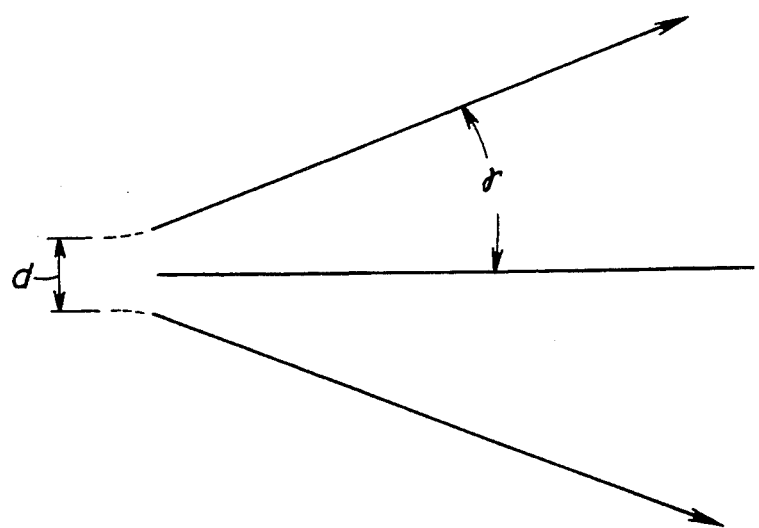
FIG. 4 is a diagram for explaining an angular region in which a shadow diffraction pattern is obtainable.

When the fine rectangular aperture of the laser diode along the longitudinal direction is regarded as the finite line source 10, an angular aperture $\gamma=15.07°$ using a relationship $\sin\gamma = \lambda/d$ in FIG. 4. Hence, it can be regarded that the angular aperture $\gamma$ limits the angular range in which the shadow pattern is obtained to approximately 15°.

As described above, the shadow pattern is generated due to the diffraction, the shadow pattern is a shadowgraph of the light transmitting portion or the light reflecting portion of the diffraction grating, and the shadow pattern moves depending on the movement of the diffraction grating. For this reason, when the periodic structure of the object is used as the diffraction grating and the movement of the generated shadow pattern is detected as a periodic change in the light quantity which is received by the photodetector, it is possible to detect the movement of the object from the corresponding relationship between the shadow pattern and the periodic structure.

Figure 5:
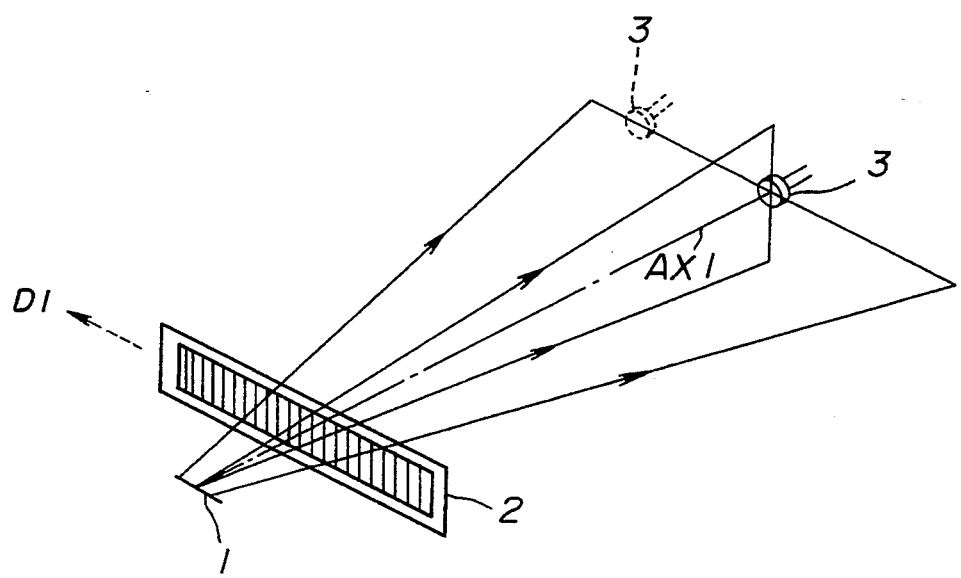
FIG. 5 is a perspective view showing an essential part of an optical system for explaining a first embodiment of an optical movement measuring method according to the present invention.

FIG. 5 shows an essential part of an optical system for explaining a first embodiment of an optical movement measuring method according to the present invention. In this embodiment, the present invention is applied to a linear encoder. In FIG. 5, a semiconductor laser is used as a finite line source 1, and a diffraction grating 2 is used as a linear encoder. The diffraction grating 2 comprises fine slits which are arranged with a constant pitch $\xi$. A shadow pattern which is generated by the arrangement of the slits of the diffraction grating 2 moves as the diffraction grating 2 moves in a direction of an arrow D1. Therefore, when a photodetector 3 is arranged at fixed positions to detect a movement of the shadow pattern as a periodic change in the received light quantity, it is possible to accurately detect the linear movement of the diffraction grating 2 based on a magnification relationship (a ratio $\xi \cdot (1+b2/b1)$ described before) between the light source, the diffraction grating 2 and the shadow pattern.

Figure 6:
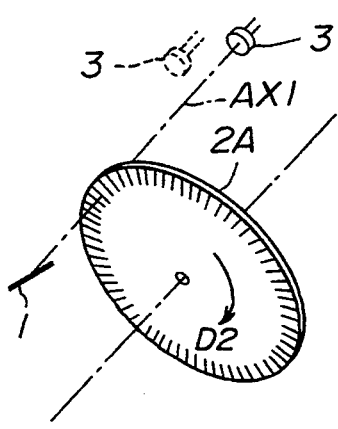
FIG. 6 is a perspective view showing an essential part of an optical system for explaining a second embodiment of the optical movement measuring method according to the present invention.

FIG. 6 shows an essential part of an optical system for explaining a second embodiment of the optical movement measuring method according to the present invention. In this embodiment, the present invention is applied to a rotary encoder. In FIG. 6, those parts which are essentially the same as those corresponding parts in FIG. 5 are designated by the same reference numerals, and a description thereof will be omitted. In FIG. 6, diffraction grating 2A which has a disk shape is used as a rotary encoder and it is possible to accurately detect the rotary movement of the diffraction grating 2A in a direction D2.

Figure 7:
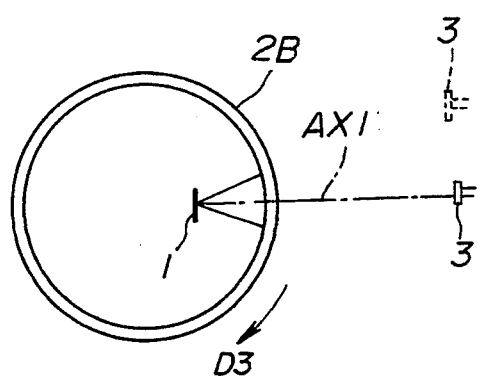
FIG. 7 is a diagram showing an essential part of an optical system for explaining a third embodiment of the optical movement measuring method according to the present invention.

FIG. 7 shows an essential part of an optical system for explaining a third embodiment of the optical movement measuring method according to the present invention. In this embodiment, the present invention is applied to a rotary encoder. In FIG. 7, those parts which are essentially the same as those corresponding parts in FIG. 5 are designated by the same reference numerals, and a description thereof will be omitted. In FIG. 7, a diffraction grating 2B which has a cylindrical shape is used as a rotary encoder, and it is possible to accurately detect the rotary movement of the diffraction grating 2B in a direction D3.

In the first through third embodiments, the photodetector 3 is provided on the optical axis AX and measures are taken so that $1/10 \leq d/\xi < 2$. However, if the photodetector 3 is arranged at a position distant from the optical axis AX as indicated by a phantom line in FIGS. 5 through 7, it is possible to satisfactorily detect the movement of the diffraction gratings 2, 2A and 2B with a high accuracy even when $\xi/d \approx 2$.

Figure 8:
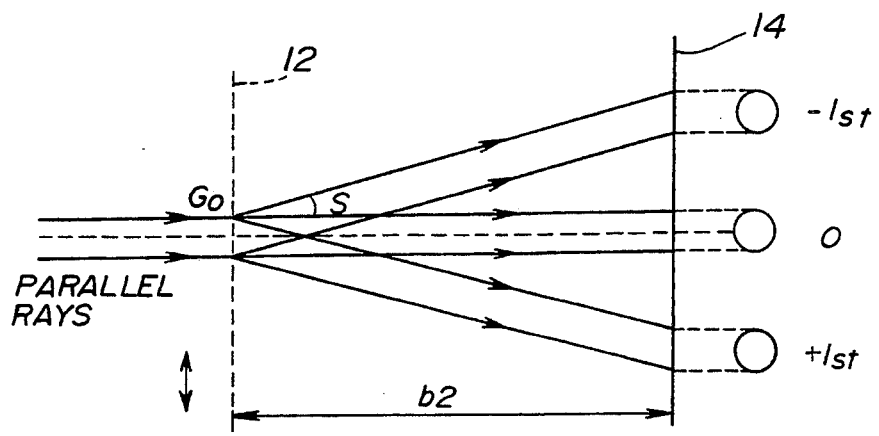
FIGS. 8 and 9 respectively are diagrams for explaining a generating mechanism of a shadow pattern.

Next, a more detailed description will be given of the generation mechanism of the shadow pattern. When a parallel ray is irradiated on a diffraction grating, it is known from the Fraunhofer diffraction that a plurality of clear diffraction spots are formed on the screen 14 which is located sufficiently away from the diffraction grating. As shown in FIG. 8, diffraction spots of each of zeroth ±1st, ±2nd, . . . orders appear at an angle S about a position G0 where the parallel ray hits the diffraction grating 12. This angle S of diffraction can be described by the following formula (1) because $\xi \cdot \sin S = n\lambda$, where $\lambda$ denotes the wavelength of the parallel ray, $\xi$ denotes the pitch of the slits of the diffraction grating 12, and n is an arbitrary integer and denotes an order of the diffracted light.

$$S = \sin^{-1}(n\lambda/\xi) \tag{1}$$

Accordingly, the zeroth order diffracted light propagates in a direction identical to the incident parallel ray to the diffraction grating 12. When the diffraction grating 12 moves a distance $\Delta B$ in the lateral direction without a movement in the vertical direction (hereinafter simply referred to as a lateral displacement), an optical wave function $U_n$ of the nth order diffraction spot can be described by the following formula (2), where $A_n$ denotes the amplitude of the nth order diffracted light and $\xi_0$ denotes a phase of the diffraction spot before the diffraction grating 12 moves.

$$U_n = A_n \exp[i(\xi_0 - (2\pi/\xi) \cdot n \cdot \Delta B)] \tag{2}$$

It may be seen from the formula (2) that an intensity $I_i$ of an ith order diffraction spot does not change even when the diffraction grating 12 moves the distance $\Delta B$ by the lateral displacement because $|U_n|^2 = |A_n|^2$.

Next, a consideration will be given of a case where the incident light to the diffraction grating 12 changes to a divergent light such as a spherical wave from the parallel ray. In this case, when a ray emitted from a position Q shown in FIG. 9 becomes a quasi-spherical wave having a divergence angle $\gamma$, the zeroth order diffraction spot and the +1st order diffraction spot overlap as the spots are enlarged, because the incident light to the diffraction grating 12 is not a parallel light but a divergent light. When the incident light to the diffraction grating 12 is a spherical wave from a perfect point light source, $\gamma = 90°$. A light intensity $I_{OV}$ in an overlap region $V_{n,n+1}$, in which the adjacent diffraction spots of different orders of diffraction overlap, may be described by the following formula (3), when it is assumed for the sake of convenience that $A_n = A_{n-1} = A$.

$$\begin{aligned} I_{OV} &= |U_n + U_{n-1}|^2 \\ &= |A|^2 \cdot |\exp[i(\omega_0 - (2\pi/\xi) \cdot n \cdot \Delta B)] + \\ &\quad \exp[i(\omega_0 - (2\pi/\xi) \cdot (n-1) \cdot \Delta B)]|^2 \\ &= 4 \cdot |A|^2 \cdot \cos^2(\Delta B/\xi) \cdot \pi \end{aligned} \tag{3}$$

From the formula (3), it may be seen that the light intensity $I_{OV}$ undergoes one period of the brightness change every time the diffraction grating 12 makes the lateral displacement for a distance which is equal to the pitch $\xi$. The light intensity $I_{OV}$ is obtained from the formula (3) under the conditions that the angle S of diffraction which is described by the formula (1) is sufficiently small and the adjacent diffraction spots overlap. In other words, the conditions are that the pitch $\xi$ of the slits of the diffraction grating 12 is sufficiently large and the distance b2 between the diffraction grating 12 and the screen 14 is sufficiently large compared to the distance b1 between the light source (finite line source 10) and the diffraction grating.

Figure 10:
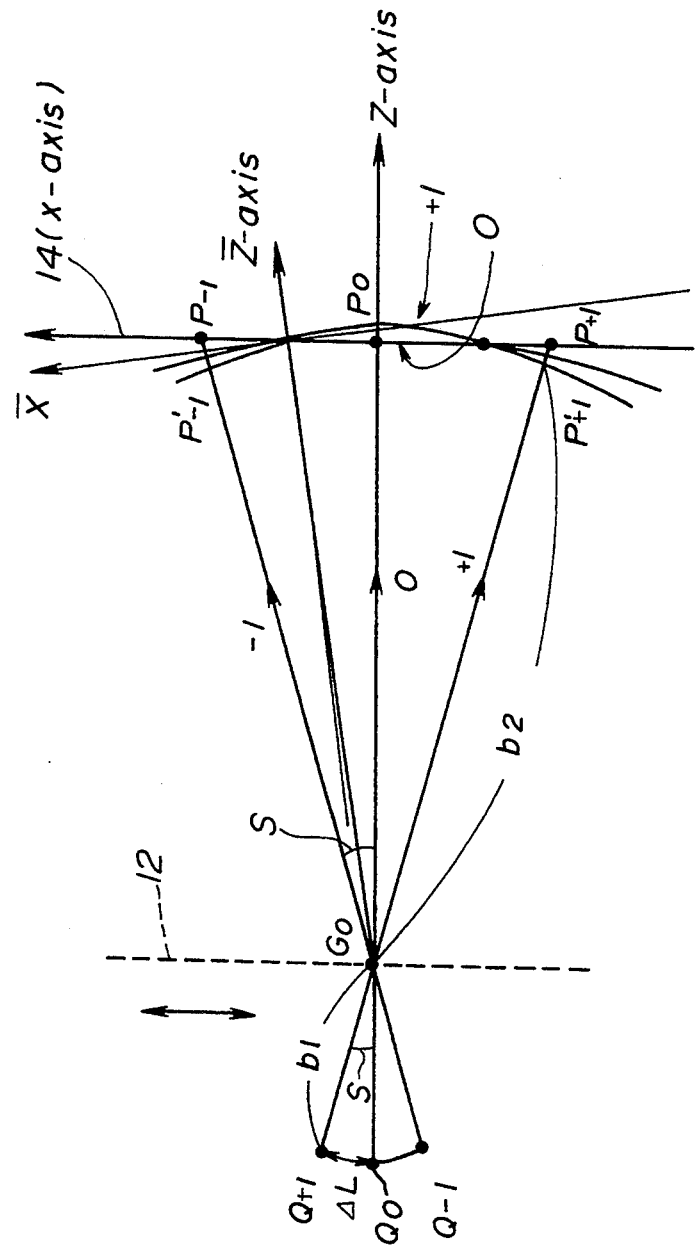

Next, a consideration will be given of a case where the distances b1 and b2 are approximately the same or the pitch $\xi$ is small. In this case, the light intensity distribution becomes as shown in FIG. 10. In FIG. 10, the x-axis corresponds to the horizontal direction on the screen 14 and the z-axis corresponds to the direction in which the optical axis AX extends. For the sake of convenience, a region $V_{0,+1}$ in which the zero order diffraction spot and the +1st order diffraction spot overlap will be considered. A divergent light emitted from the finite line source 10 which is located at a position Q0 passes through the diffraction grating 12 and is formed into the zero order diffracted light which progresses along the optical axis AX and the +1st order diffracted light which progresses at the angle S ($= \sin^{-1}(\lambda/\xi)$) to the optical axis AX. As shown in FIG. 10, the +1st order diffracted light may be considered as a divergent light which progresses linearly from an imaginary light source which is located at a position $Q_{+1}$. Accordingly, a phase difference between the zero order diffraction spot and the +1st order diffraction spot which overlap in the region $V_{0,+1}$ must consider in addition to the formula (3) a difference $\Delta z(x)$ between the optical paths which is introduced due to the fact that the lights emitted from the different positions Q0 and $Q_{+1}$ are quasi-spherical waves. This difference $\Delta z(x)$ between the optical paths may be calculated as follows.

A horizontal shift $\Delta L$ of the positions Q0 and $Q_{+1}$ can be calculated from the following formula (4) by approximation when $\angle Q_0 G_0 Q_{+1} = \angle P_0 G_0 P_{+1} = S$ and the angle S is small.

$$\Delta L = b1 \cdot S \approx b1(\lambda/\xi) \tag{4}$$

In addition, when the zero order diffracted light and the +1st order diffracted light are respectively approximated by the spherical waves about the positions Q0 and $Q_{+1}$, optical paths L0 and $L_{+1}$ of the zero and +1st order diffracted lights can be described by the following set of formulas (5) when the x-axis and the z-axis are rotated an angle S/2 counterclockwise to set an $\bar{x}$-axis and a $\bar{z}$-axis of a rotated coordinate system as shown in FIG. 11 and an origin P0 of this rotated coordinate system is arranged at an intermediate position between the positions Q0 and $Q_{+1}$, where $a=b1+b2$.

$$\left. \begin{array}{l} L_0^2 = (\Delta L/2 + x)^2 + a^2 \\ L_{+1}^2 = (\Delta L/2 + x)^2 + a^2 \end{array} \right\} \quad (5)$$

Accordingly, the difference $\Delta z$ (x) between the optical paths L0 and $L_{+1}$ can be described by the following formula (6) if the angle S is small since the coordinate on the $\bar{x}$-axis can be approximated by $\bar{x}=x\cdot\cos(S/2)\approx x$.

$$\begin{aligned} L_0 - L_1 &= [a^2 + (x + \Delta L/2)^2]^{\frac{1}{2}} - \\ &\quad [a^2 + (x - \Delta L/2)^2]^{\frac{1}{2}} \\ &\approx a[1 + (\tfrac{1}{2})((x + \Delta L/2)/a)^2] - \\ &\quad a[1 + (\tfrac{1}{2})((x - \Delta L/2)/a)^2] \\ &= (\tfrac{1}{2}a)[(x + \Delta L/2)^2 - (x - \Delta L/2)^2] \\ &= (\Delta L/a)\cdot x \\ &= (b1/(b1 + b2))\cdot \lambda/\xi \cdot x \end{aligned} \quad (6)$$

Therefore, a coordinate x0 on the screen 14 where the bright stripe is generated within the region $V_{0,+1}$ is a position where the difference $\Delta z(x)$ between the optical paths is an integral multiple of the wavelength $\lambda$. This means that the following formula (7) stands.

$$x0 = n\cdot(1+b2/b1)\cdot\xi \quad (7)$$

In the formula (7), the term $(1+b2/b1)$ indicates the magnification of the shadow pattern. The light intensity $I_{OV}$ in the region $V_{0,+1}$ can thus be obtained from the following formula (8) based on the formulas (2), (3) and (6).

$$I_{OV} = 4\cdot|A|^2\cdot\cos^2\left[(\Delta\delta/\xi + (b1/(b1+b2))\cdot x/\xi])\cdot\pi\right] \quad (8)$$

Figure 9:
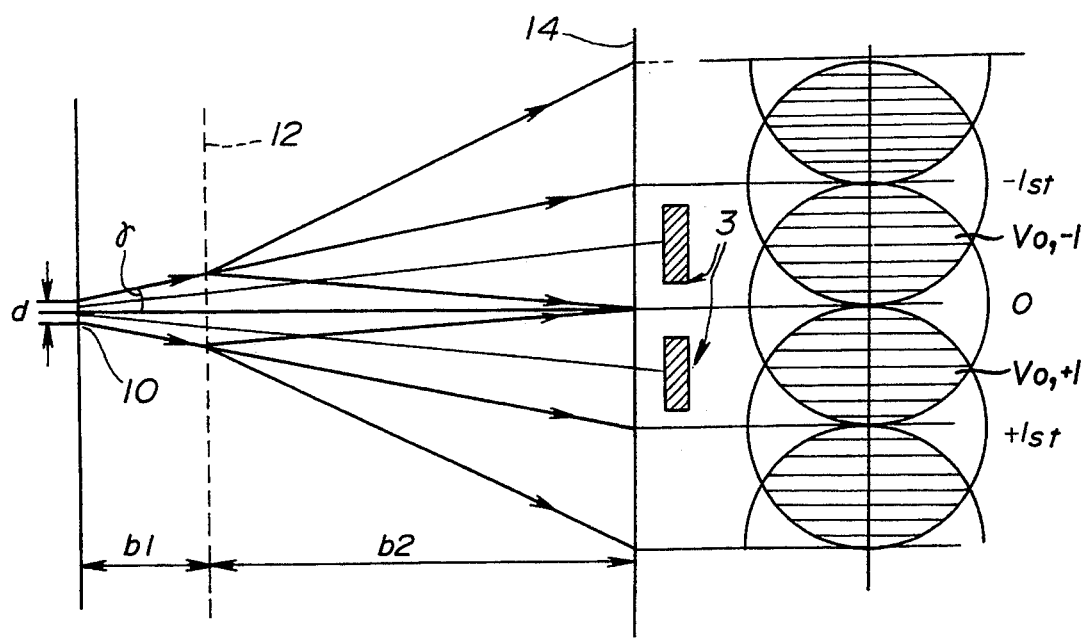

As the formula (8) indicates, interference fringes of bright and dark portions appear in the region $V_{0,+1}$, and the interference fringes have a period $\xi' = (1+b2/b1)\cdot\xi$. This period $\xi'$ is enlarged compared to the pitch $\xi$ of the slits of the diffraction grating 12. Furthermore, it can be seen that the interference fringes move when the diffraction grating 12 undergoes a lateral displacement. Thus, by arranging the photodetector 3 within the region $V_{0,+1}$ as shown in FIG. 9, it is possible to detect the movement of the diffraction grating 12.

Of course, the region in which the interference fringes (shadow diffraction image) are generated is not limited to the region $V_{0,+1}$ in which the zero and +1st order diffraction spots overlap. The interference fringes are similarly generated within each region $V_{0,\pm 1}$ in which an ith order diffraction spot and an (i±1)th order diffraction spot overlap.

Next, a description will be given of the conditions of the light source for generating the interference fringes (shadow diffraction image). As described before in conjunction with FIG. 4, the divergence angle $\gamma$ of the divergent light may be described by the following formula (9).

$$\sin\gamma = \lambda/d \quad (9)$$

FIG. 14 is a diagram showing diffracted lights for a case where $\delta < S/2$ (d>2$\xi$). FIGS. 15A through 15E respectively show diffraction spots formed at various distances from the diffraction grating 12 in FIG. 14.

FIG. 16 is a diagram showing diffracted lights for a case where $\delta = S/2$ (d=2$\xi$). FIGS. 17A through 17D respectively show diffraction spots formed at various distances from the diffraction grating 12 in FIG. 16.

FIG. 18 is a diagram showing diffracted lights for a case where $\gamma = S$ (d=$\xi$). FIGS. 19A through 19D respectively show diffraction spots formed at various distances from the diffraction grating 12 in FIG. 18.

FIG. 20 is a diagram showing diffracted lights for a case where $\gamma > S$ (d<$\xi$). FIGS. 21A through 21D respectively show diffraction spots formed at various distances from the diffraction grating 12 in FIG. 20.

Figure 12A:
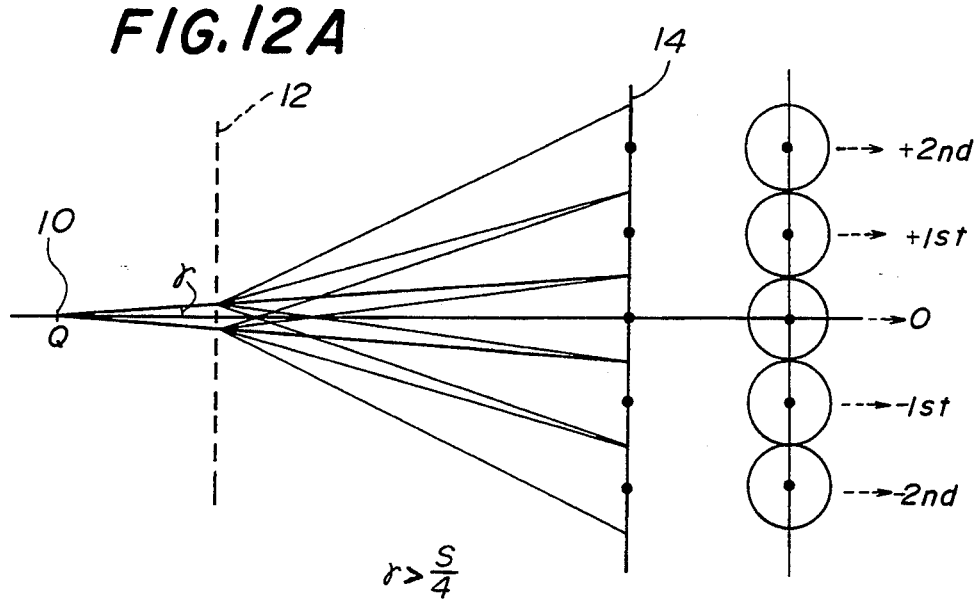
FIGS. 12A and 12B respectively are diagrams for explaining conditions of the light source for obtaining interference fringes (shadow diffraction image)
Figure 12B:
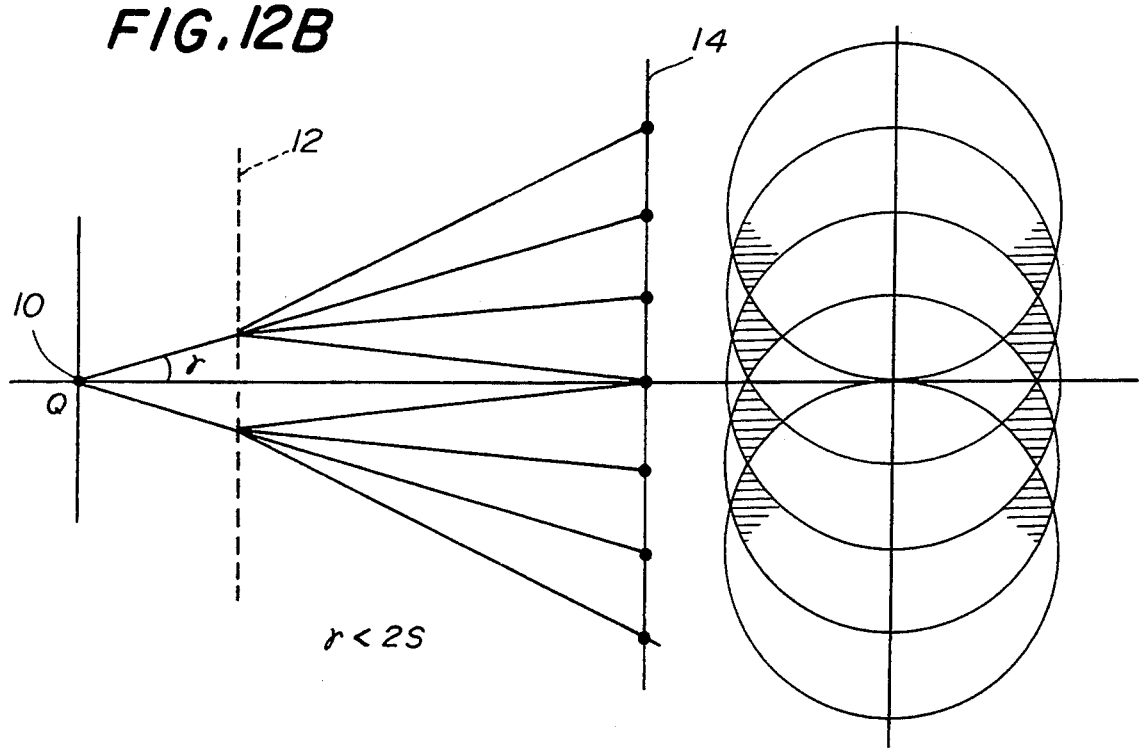

As may be seen from FIG. 12A which shows a case where $\gamma > S/4$ and FIG. 12B which shows a case where $\gamma < 2S$, the diameter of the diffraction spot of each order of diffraction increases and only the adjacent diffraction spots of different orders of diffraction overlap when the divergence angle $\gamma$ satisfies a relation $S/4 \leq \gamma \leq 2S$. Hence, the following relation (10) can be obtained from the formulas (1) and (9).

$$(\tfrac{1}{4})\sin^{-1}(\lambda/\xi) \leq \sin^{-1}(\lambda/d) \leq 2S\sin^{-1}(\lambda/\xi) \quad (10)$$

On the other hand, when both $\gamma$ and S are small, the relation (10) can be approximated by the following relation (11).

$$\tfrac{1}{4} \leq d/\xi \leq 4 \quad (11)$$

In addition, the diffraction spots overlap in a region which has a maximum area when $S=\gamma$, that is, when the following equation (12) stands.

$$d = \xi \quad (12)$$

The light source has a size approximately equal to the pitch $\xi$ of the slits of the diffraction grating such that the above described quasi-spherical wave is generated. The light emitted from such a light source may be realized by a light emitted from a laser diode which has a rectangular aperture, a light emitted through a slit which has an aperture width approximately equal to the pitch $\xi$, or a light emitted through an optical fiber which has a core diameter approximately equal to the pitch $\xi$.

The light source needs only to have a coherence such that a coherence length is approximately the same as the distance between the light source and the photodetector or the screen. With regard to the wavelength of the light emitted from the light source, the diffraction angle S of diffraction increases as the wavelength $\lambda$ increases when the pitch $\xi$ is constant as may be seen from the formula (1), but the divergence angle $\gamma$ also increases when the length d of the light source is constant as may be seen from the formula (9). As a result, the two diffraction spots overlap each other in the same manner, and the interference fringes of bright and dark portions are generated at the same position regardless of the wavelength $\lambda$ of the light source as may be seen from the formula (8). Accordingly, it is possible to obtain the interference fringes (shadow diffraction image) which have a sufficiently high contrast even when the light source does not emit a monochromatic light.

Next, a description will be given of the effects of the characteristic of the diffraction grating on the interference fringes (shadow diffraction image). When the amplitudes of the adjacent diffraction spots of different orders of diffraction are denoted by $A_i$ and $A_{i-1}$, a contrast Ic of the interference fringes can be obtained from the following formula (13).

$$Ic = [2A_i A_{i-1}/(A_n^2 + A_{n-1}^2)] \times 100 \qquad (13)$$

Accordingly, when the two amplitudes $A_i$ and $A_{i-1}$ are equal, the contrast Ic becomes a maximum value which is 100%.

FIGS. 13A, 13B and 13C respectively show light intensity distributions of Fraunhofer images which are obtained when a parallel ray is irradiated on the diffraction grating having the slits which are provided with the pitch $\xi$, where each slit has the width $\delta$. FIG. 13A shows a case where $\delta/\xi = \frac{1}{3}$, FIG. 13B shows a case where $\delta/\xi = \frac{1}{2}$, and FIG. 13C shows a case where $\delta/\xi = \frac{2}{3}$. On the other hand, FIG. 13D shows a light intensity distribution of a Fraunhofer image which is obtained when a parallel ray is irradiated on a sinusoidal grating. The diffraction spot is generated for higher order of diffraction as the width $\delta$ of the slit becomes smaller. In addition, the amplitude $A_0$ of the zero order diffracted light becomes equal to the amplitudes $A_{+1}$ and $A_{-1}$ of the $\pm 1$st order diffracted light. Accordingly, the contrast of the stripe becomes high as may be seen from the formula (13). In the case of the diffraction grating 12 having the transmitting and non-transmitting portions, the amplitudes $A_{+1}$ and $A_{-1}$ of the $\pm 1$st order diffracted light can be obtained from the following formula (14) when the amplitude $A_0$ of the zero order diffracted light is $A_0 = 1$.

$$A_{\pm 1} = [\sin((\delta/\xi)\cdot\pi)]/(\delta/\xi) \qquad (14)$$

The following Table shows the contrast Ic of the interference fringes which are obtained for each kind of diffraction grating.

TABLE

| | Ronchi Grating | | | Sinusoidal Grating |
|---|---|---|---|---|
| $\delta/\xi$ | $\frac{1}{3}$ | $\frac{1}{2}$ | $\frac{2}{3}$ | |
| | 98% | 91% | 71% | 80% |

The sinusoidal grating is characterized in that only the zero order diffraction spot and the $\pm 1$st order diffraction spots are generated and that the amplitudes of the $\pm 1$st order diffraction spots are $\frac{1}{2}$ the amplitude of the zero order diffraction spot. Because the $\pm 2$nd order diffraction spots and higher order diffraction spots are not generated, it is possible to moderate the conditions with respect to the length d of the finite line source 10 for causing an overlap of only the zero and +1st order diffraction spots and the zero and −1st order diffraction spots. In other words, even when the length d is $\frac{1}{2}$ the pitch $\xi$ or less, it is possible to obtain satisfactory interference fringes. In addition, the total light quantity emitted from the light source 10 is concentrated at the zero and $\pm 1$st order diffraction spots, the light intensity of the interference fringes is large between the zero order diffraction spot and the $\pm 1$st order diffraction spots, and the signal detection efficiency of the photodetector 3 is improved.

Therefore, it is most effective from the point of view of obtaining satisfactory interference fringes for use in detecting the movement of the diffraction grating 12 when the diffraction grating 12 has an aperture characteristic such that only the zeroth and $\pm 1$st order diffraction spots are generated when the parallel light is irradiated on the diffraction grating 12 and the amplitudes of the zeroth and $\pm 1$st order diffraction spots are the same.

Next, a description will be given of a first embodiment of the optical movement measuring apparatus according to the present invention, by referring to FIG. 22. The optical movement measuring apparatus generally comprises the light source 10, the diffraction grating 12, first and second photodetector parts $50_1$ and $50_2$, amplifiers $51_1$ and $51_2$, analog-to-digital (A/D) converters $52_1$ and $52_2$, an operation circuit 53, and a counter 54 which are coupled as shown. The photodetector part $50_1$ comprises a fixed grating G1 and a photodetector D1, and the photodetector part $50_2$ comprises a fixed grating G2 and a photodetector D2. For example, the photodetectors D1 and D2 are photodiodes.

The photodetectors D1 and D2 are arranged at positions P1 and P2 where a line from the center of the light source 10 forms the angle $\gamma$ to the optical axis AX. It is assumed for the sake of convenience that $\gamma \approx \lambda b2/2\xi$. In this case, the pitch $\xi'$ of the interference fringes can be described by the following formula (15).

$$\xi' = (1 + b2/b1)\cdot\xi \qquad (15)$$

Accordingly, by setting a pitch of the slits of the fixed diffraction gratings G1 and G2 to $\xi'$, a brightness signal is received by the photodetectors D1 and D2 every time the diffraction grating 12 moves one pitch $\xi$.

Figure 23B:
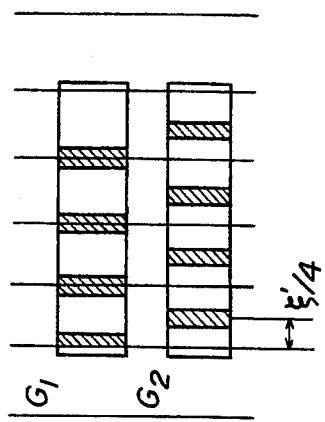
FIGS. 23A and 23B respectively are diagrams for explaining a spatial arrangement of two fixed gratings shown in FIG. 22.
Figure 23A:
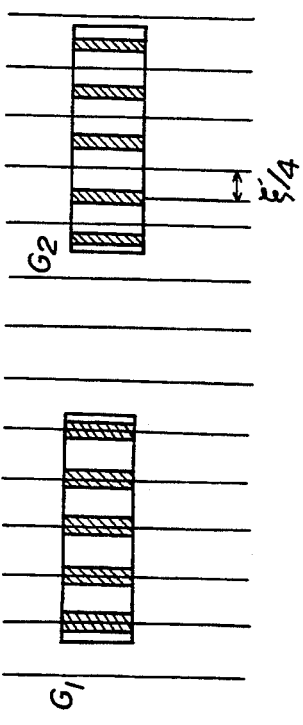

The fixed diffraction gratings G1 and G2 are spatially arranged as shown in FIG. 23A or 23B, that is, so that the positions of the fixed diffraction gratings G1 and G2 are shifted by $\frac{1}{4}$ the pitch $\xi'$ relative to each other. As a result, detection signals output from the photodetectors D1 and D2 have a phase difference of 90°, and it is possible to detect the moving direction of the diffraction grating 12 from the detection signals.

The detection signals output from the photodetectors D1 and D2 are appropriately amplified into signals S1 and S2 shown in FIGS. 24A and 24B in the respective amplifiers $51_1$ and $51_2$. The signals S1 and S2 are supplied to the respective A/D converters $52_1$ and $52_2$ and converted into digital signals B1 and B2 shown in FIGS. 25A and 25B. When the number of bits of the A/D converters $52_1$ and $52_2$ is two, the number of pulses output from the A/D converters $52_1$ and $52_2$ is the number of moved stripes of the interference fringes. When the number of bits of the A/D converters $52_1$ and $52_2$ is N, the number of pulses output from the A/D converters $52_1$ and $52_2$ is N times the number of moved stripes of the interference fringes.

The digital signals B1 and B2 are supplied to the operation circuit 53 which carries out a operation and outputs a pulse signal C1 which indicates the movement of the diffraction grating 12 and a direction signal C2 which indicates the direction of the movement. The signals C1 and C2 are supplied to the counter 54 and counted. Hence, it is possible to accurately detect the movement of the diffraction grating 12 from an output of the counter 54.

Generally, when only an mth order diffraction spot and an nth order diffraction spot are generated, the interference fringes are generated about a center of the two diffraction angles with a period $\xi' = |1/(m-n)| \cdot (1+b2/b1) \cdot \xi$, and a magnification or reduction takes place about this center of the two diffraction angles. It is thus desirable to arrange the photodetectors D1 and D2 at each center of the two diffraction angles.

Figure 26A:
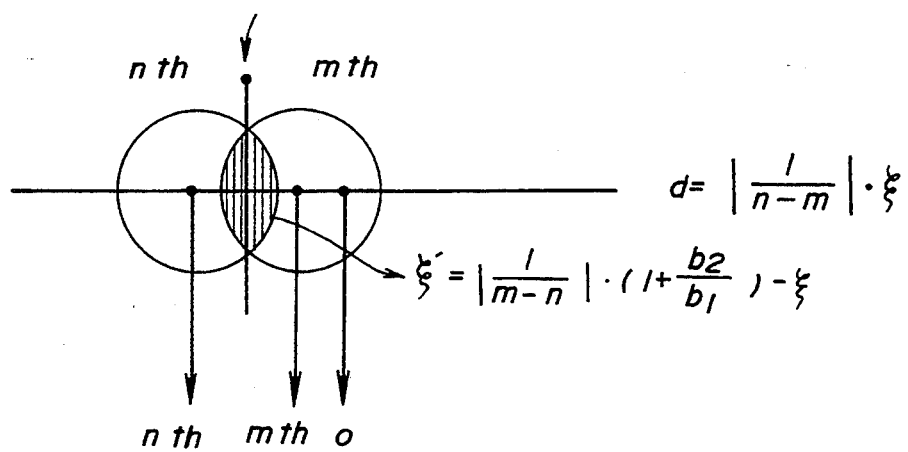
FIGS. 26A and 26B respectively show diffraction spots and a Fraunhofer image which are generated when only nth and mth order diffraction spots are generated.
Figure 26B:
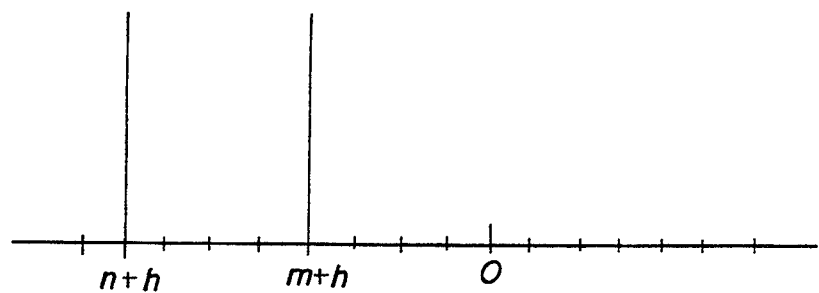

FIG. 26A shows the diffraction spots for a case where $d = |1/(n-m)| \cdot \xi (m \neq n)$, and FIG. 26B shows the Fraunhofer image obtained in the case shown in FIG. 26A. In this case, the period $\xi'$ of the interference fringes is $|1/(m-n)| \cdot (1+b2/b1) \cdot \xi$.

Figure 27A:
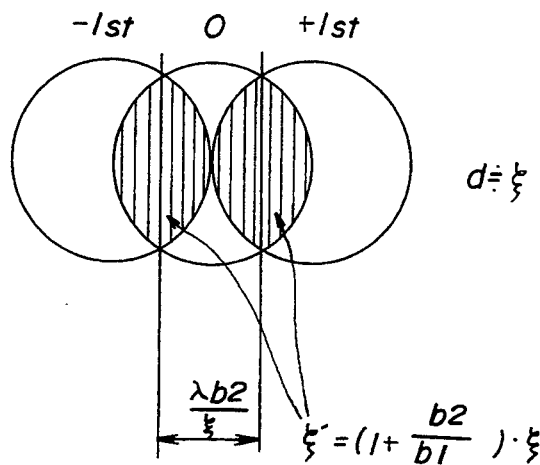
FIGS. 27A and 27B respectively show diffraction spots and a Fraunhofer image which are generated when the zero and ±1st order diffraction spots are generated.
Figure 27B:
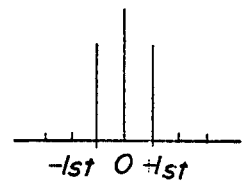

FIG. 27A shows the diffraction spots for a case where the zero and ±1st order diffraction spots are generated and $d \approx \xi$, and FIG. 27B shows the Fraunhofer image obtained in the case shown in FIG. 27A. In this case, the period $\xi'$ of the interference fringes is $(1+b2/b1) \cdot \xi$, and a distance between the centers of magnification is $\lambda b2/\xi$.

Figure 28A:
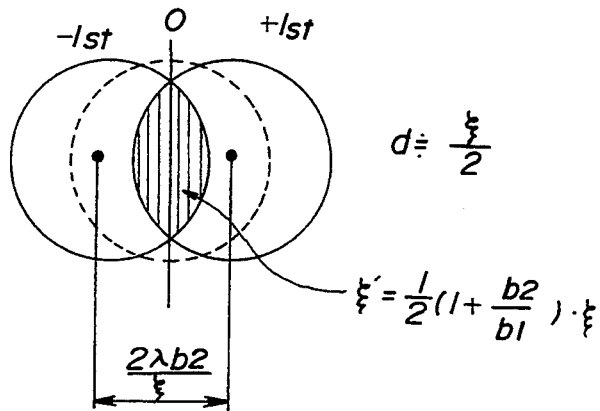
FIGS. 28A and 28B respectively show diffraction spots and a Fraunhofer image which are generated when only the ±1st order diffraction spots are generated.
Figure 28B:
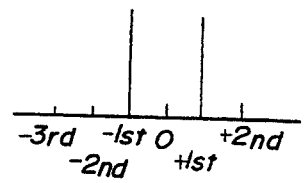

FIG. 28A shows the diffraction spots for a case where only the ±1st order diffraction spots are generated and $d \approx \xi/2$, and FIG. 28B shows the Fraunhofer image obtained in the case shown in FIG. 28A. In this case, the period $\xi'$ of the interference fringes is $(\frac{1}{2}) \cdot (1+b2/b1) \cdot \xi$, and a distance between the centers of magnification is $2\lambda b2/\xi$.

Figure 29A:
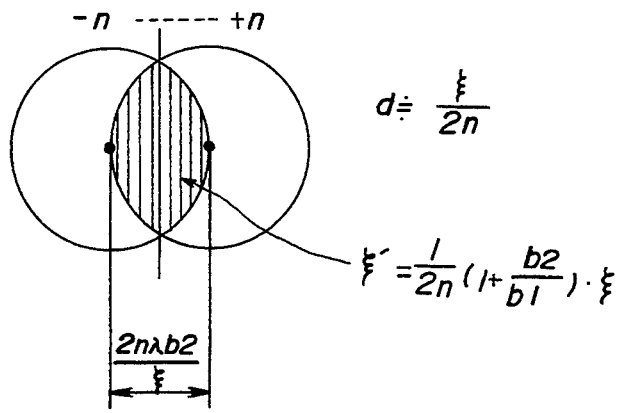
FIGS. 29A and 29B respectively show diffraction spots and a Fraunhofer image which are generated when only the ±nth order diffraction spots are generated.
Figure 29B:
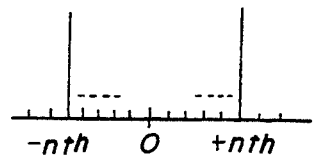

FIG. 29A shows the diffraction spots for a case where only the ±nth order diffraction spots are generated and $d \approx \xi/2n$, and FIG. 29B shows the Fraunhofer image obtained in the case shown in FIG. 29A. In this case, the period $\xi'$ of the interference fringes is $(\frac{1}{2}n) \cdot (1+b2/b1) \cdot \xi$, and a distance between the centers of magnification is $2n\lambda b2/\xi$.

In the embodiments described heretofore, the diffraction gratings 2, 2A, 2B and 12 have the slits for transmitting the light which is received from the light sources 1 and 10. However, the diffraction grating is not limited to the transmitting type and a reflecting type diffraction grating may also be used. Such a reflecting type diffraction grating has the reflecting portions arranged with a predetermined pitch.

Figure 30:
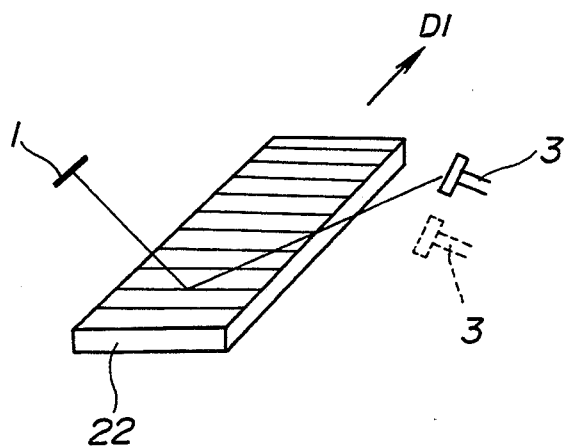
FIG. 30 is a perspective view showing an essential part of an optical system for explaining a fourth embodiment of the optical movement measuring method according to the present invention.

FIG. 30 shows an essential part of an optical system for explaining a fourth embodiment of the optical movement measuring method according to the present invention. In this embodiment, the present invention is applied to a linear encoder. In FIG. 30, those parts which are essentially the same as those corresponding parts in FIG. 5 are designated by the same reference numerals. A laser diode is used as the finite line source 1, and a linear encoder is used as a diffraction grating 22. The diffraction grating 22 comprises fine reflecting portions which are arranged with a constant pitch $\xi'$. A shadow pattern which is generated by the arrangement of the reflecting portions of the diffraction grating 2 moves as the diffraction grating 2 moves in a direction of an arrow D1. Therefore, when the photodetector 3 is arranged at fixed positions to detect a movement of the shadow pattern as a periodic change in the received light quantity, it is possible to accurately detect the linear movement of the diffraction grating 22 based on a magnification relationship (a ratio $(1+b2/b1)$ described before) between the diffraction grating 22 and the shadow pattern.

Figure 31:
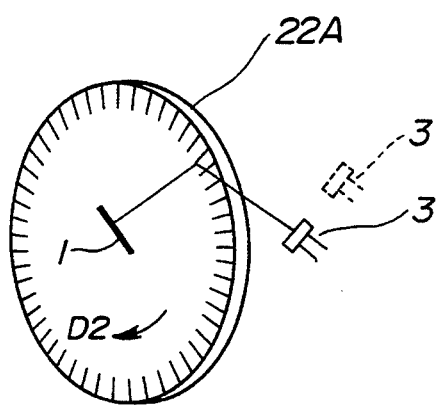
FIG. 31 is a perspective view showing an essential part of an optical system for explaining a fifth embodiment of the optical movement measuring method according to the present invention.

FIG. 31 shows an essential part of an optical system for explaining a fifth embodiment of the optical movement measuring method according to the present invention. In this embodiment, the present invention is applied to a rotary encoder. In FIG. 31, those parts which are essentially the same as those corresponding parts in FIG. 6 are designated by the same reference numerals. In FIG. 31, a rotary encoder which has a disk shape is used as a diffraction grating 22A, and it is possible to accurately detect the rotary movement of the diffraction grating 22A in a direction D2.

Figure 32:
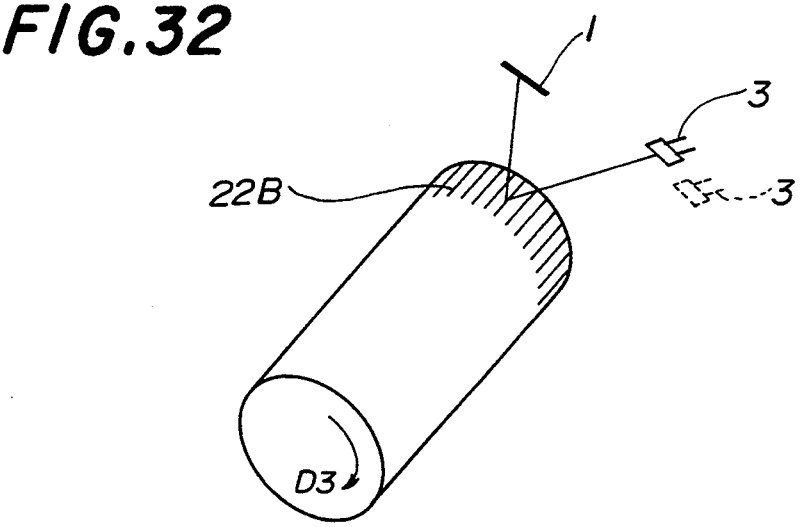
FIG. 32 is a diagram showing an essential part of an optical system for explaining a sixth embodiment of the optical movement measuring method according to the present invention.

FIG. 32 shows an essential part of an optical system for explaining a sixth embodiment of the optical movement measuring method according to the present invention. In this embodiment, the present invention is applied to a rotary encoder. In FIG. 32, those parts which are essentially the same as those corresponding parts in FIG. 7 are designated by the same reference numerals. In FIG. 32, a rotary encoder which has a cylindrical shape is used as a diffraction grating 22B, and it is possible to accurately detect the rotary movement of the diffraction grating 22B in a direction D3. The diffraction grating may be formed on the peripheral surface of the cylinder by providing a magnetic recording layer on the peripheral surface of the cylinder, writing a magnetic pattern on the magnetic recording layer, and developing the magnetic pattern by a magnetic colloidal fluid into the grating pattern. The method of forming the diffraction grating on the peripheral surface of the cylinder is further disclosed in a U.S. patent application entitled "ROTATION QUANTITY MEASURING METHOD AND APPARATUS" (Preliminary Ser. No. 07/397,287 with a filing date of Aug. 23, 1989), the disclosure of which is hereby incorporated by reference.

Figure 33:
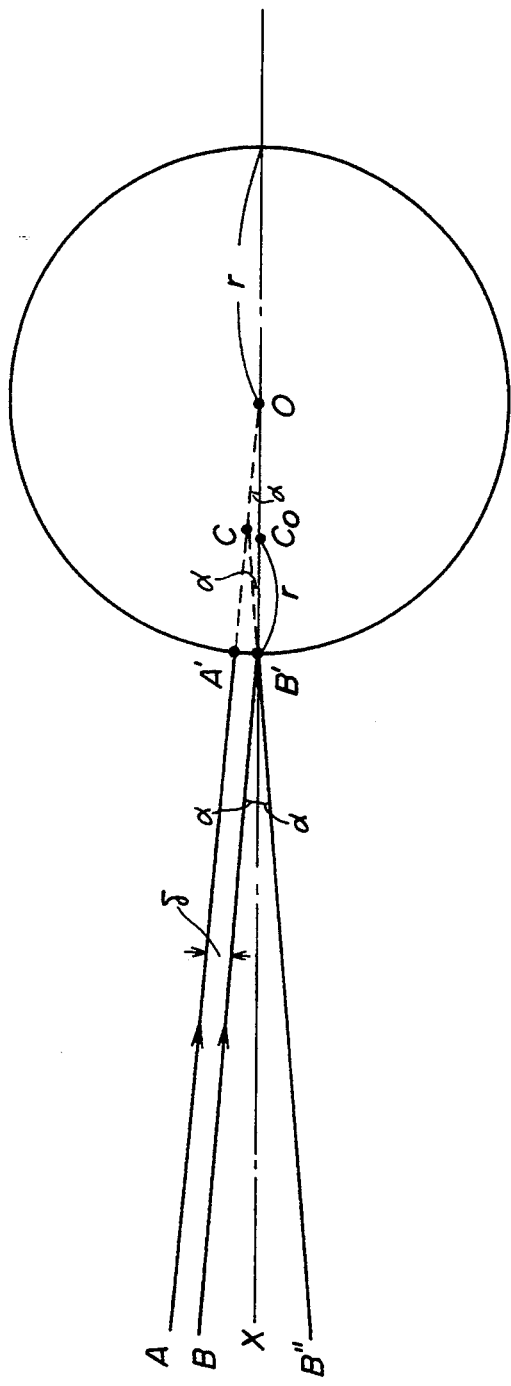
FIG. 33 is a diagram for explaining a reflection at a peripheral surface of a cylinder when the light from the light source progresses towards a center of the cylinder.

FIG. 33 is a diagram for explaining a reflection at a peripheral surface of the cylinder when the light from the light source progresses towards a center of the cylinder. In FIG. 33, parallel rays $\overrightarrow{AA'}$ and $\overrightarrow{BB'}$ are incident to a mirror cylindrical surface S. The ray $\overrightarrow{AA'}$ progresses on a first imaginary line which passes a center O of the cylinder, while the ray $\overrightarrow{BB'}$ is parallel to the ray $\overrightarrow{AA'}$ but progresses on a second imaginary line which is slightly shifted from the first imaginary line. From the law of reflection, the ray $\overrightarrow{AA'}$ reflects as a reflected ray $\overrightarrow{A'A}$ at the cylindrical surface S because the ray $\overrightarrow{AA'}$ progresse on the first imaginary line. On the other hand, the ray $\overrightarrow{BB'}$ hits the cylindrical surface S with an incident angle $\alpha$ to an optical axis which is an extension of a line B'O, and reflects as a reflected ray $\overrightarrow{B'B''}$. Accordingly, the reflected rays $\overrightarrow{A'A}$ and $\overrightarrow{B'B''}$ are as if these rays were emitted from an intersection point C of an extension of the reflected ray $\overrightarrow{A'A}$ and an extension of the reflected ray $\overrightarrow{B'B''}$. Because a triangle $\Delta$CB'O is an isosceles triangle, the intersection point C is located on a perpendicular bisector which passes through a point Co which is a distance r/2 from the cylindrical surface S, where r denotes the radius of the cylinder. If a width $\delta$ of the parallel rays $\overrightarrow{AA'}$ and $\overrightarrow{BB'}$ is small, the points C and Co substantially coincide. Therefore, when parallel rays are irradiated on the cylindrical surface S and reflected, the reflected rays diverge as if a point light source is located at a distance r/2 from the cylindrical surface S.

Figure 34:
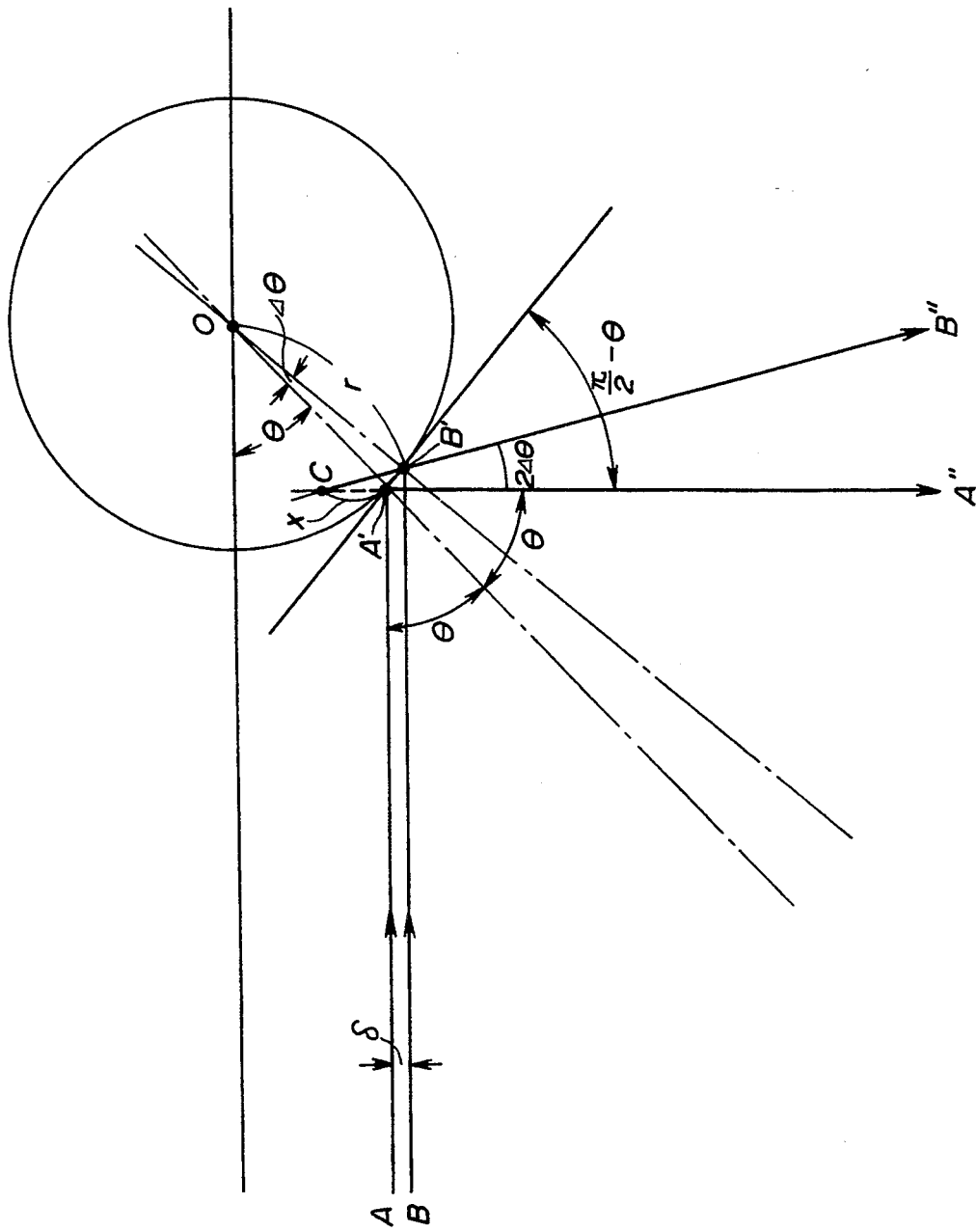
FIG. 34 is a diagram for explaining a reflection at the peripheral surface of the cylinder when the light from the light source progresses towards a point away from the center of the cylinder.

FIG. 34 is a diagram for explaining a reflection at the peripheral surface of the cylinder when the light from the light source progresses towards a point away from the center of the cylinder. In FIG. 34, the same designations are used as in FIG. 33. In this case, the reflected rays $\overrightarrow{A'A''}$ and B'B'' diverge with an angle $2 \cdot \Delta\theta$, where $\Delta\theta$ denotes a central angle an arc $\overrightarrow{A'B'}$ makes with respect to a center axis O. If the central angle $\Delta\theta$ is extremely small, the arc $\overset{\frown}{A'B'}$ may be regarded as being approximately the same as a chord $\overline{A'B'}$. Accordingly, the following relation stands when a distance $\overline{CA'}$ from an apparent light source to the arc is denoted by X.

$$X \cdot 2\Delta\theta \approx r \cdot \Delta\theta \cdot \cos\theta$$

Thus, when $\Delta\theta \to 0$, the following equation stands.

$$X = (r/2) \cdot \cos\theta$$

If the width $\delta$ of the parallel rays $\vec{AA'}$ and $\vec{BB'}$ is sufficiently small and the parallel rays $\vec{AA'}$ and $\vec{BB'}$ are irradiated on the cylindrical surface S and reflected, the reflected rays diverge as if a point light source is located at a distance X from the cylindrical surface S.

Figure 35:
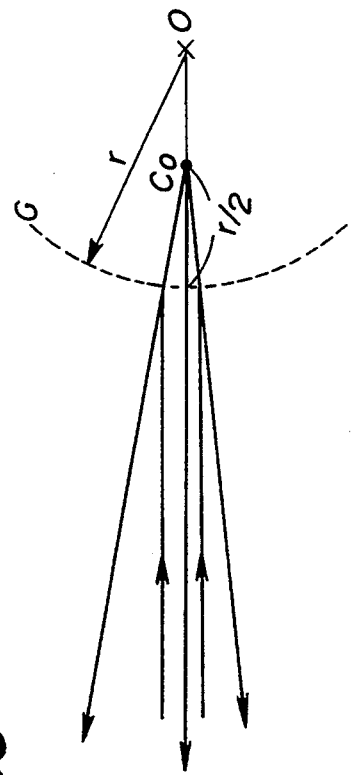
FIG. 35 is a diagram for explaining a reflection at the peripheral surface of the cylinder 10 when the diffraction grating has strips of reflecting portions arranged parallel to a generation line to the cylinder.

FIG. 35 is a diagram for explaining a reflection at the peripheral surface of the cylinder when the diffraction grating has strips of reflecting portions arranged parallel to a generation line to the cylinder. In FIG. 35, the same designations are used as in FIG. 33. In this case, the parallel rays $\vec{AA'}$ and $\vec{BB'}$ are incident to the diffraction grating 22B towards the center O and are reflected as if the reflected rays were diverged from the point Co and the diffraction grating 22B were the transmitting type. The shadow pattern which is generated in this case is equivalent to that generated when a transmitting type diffraction grating is irradiated by the rays from a point light source which is located at the point Co. In other words, the apparent point light source is located at the point Co which is a distance r/2 from the diffraction grating 22B. In this case, the size of the apparent point light source is not a perfect point due to spherical abberation. This means that the width $\delta$ of the parallel rays $\vec{AA'}$ and $\vec{BB'}$ must be sufficiently small in order to obtain a shadow pattern with a high contrast when the pitch of the reflecting portions of the diffraction grating 22B is small.

Similarly, when the parallel rays $\vec{AA'}$ and $\vec{BB'}$ are incident to the diffraction grating 22B towards a point shifted from the center O, the rays $\vec{AA'}$ and $\vec{BB'}$ are reflected as if the reflected rays were diverged from the point which is the distance X from the diffraction grating 22B and the diffraction grating 22B were the transmitting type. The distance X can be described by $X = (r/2) \cdot \cos\theta$.

In the fourth through sixth embodiments, the photodetector 3 is provided on the optical axis AX and measures a taken so that $1/10 \leq d/\xi < 2$. However, if the photodetector 3 is arranged at a position distant from the optical axis AX as indicated by a phantom line in FIGS. 30 through 32, it is possible to satisfactorily detect the movement of the diffraction gratings 22, 22A and 22B with a high accuracy even when $\xi/d \approx 2$.

Figure 22:
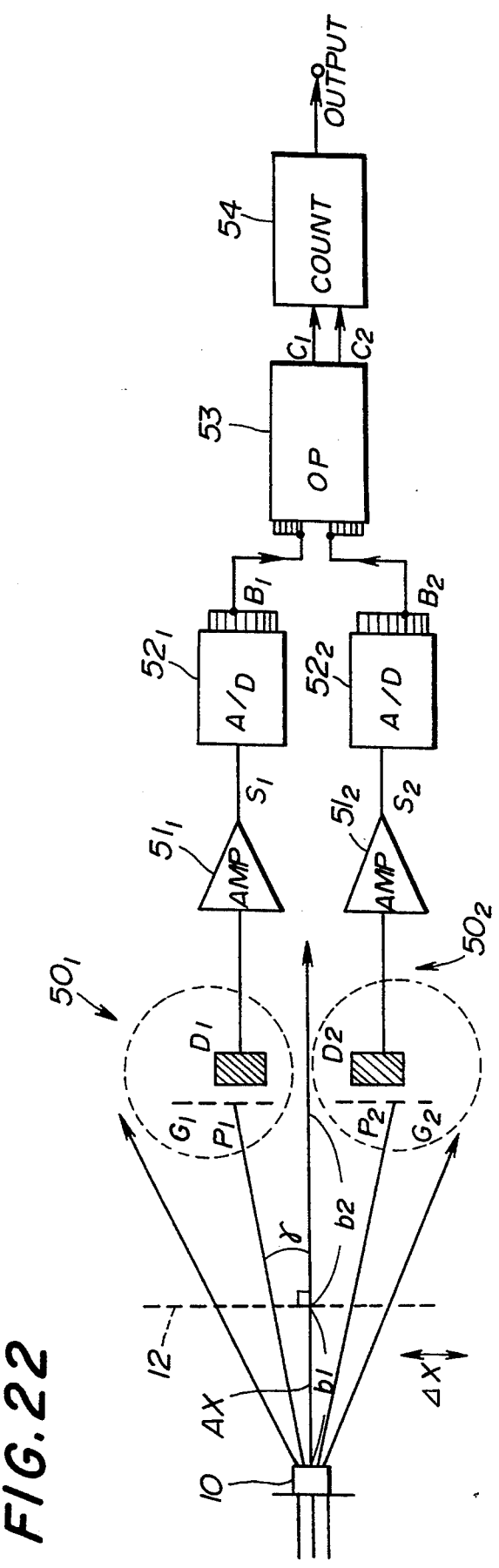
FIG. 22 is a system block diagram showing a first embodiment of an optical movement measuring method according to the present invention.

In the first embodiment of the optical movement measuring apparatus described in conjunction with FIG. 22, the present invention is applied to the linear encoder and the transmitting type diffraction grating is used for the sake of convenience. However, it may be readily understood that the optical movement measuring apparatus according to the present invention may employ any of the arrangements shown in FIGS. 5, 6, 7, 30, 31 and 32 for the generation and detection of the shadow pattern or interference fringes.

In addition, in each of the described embodiments, the shadow pattern or interference fringes may be detected by use of a plurality of photodetectors instead of using a single photodetector.

Further, the present invention is not limited to these embodiments, but various variations and modifications may be made without departing from the scope of the present invention.

What is claimed is:

1. An optical movement measuring method for measuring a movement of an object, said optical movement measuring method comprising the steps of:
   irradiating a light from a light source on a diffraction grating which is provided on the object so as to generate diffracted lights of different orders of diffraction, said diffraction grating having light transmitting portions and light blocking portions which are alternately and periodically arranged;
   detecting interference fringes which are generated by overlapping spots of diffracted lights of two mutually different orders of diffraction, said interference fringes comprising bright and dark stripes which occur alternately; and
   measuring a movement of the object based on a counted number of stripes of the detected interference fringes,
   said step of irradiating the light using a light which is emitted from a finite line source which has a length d,
   said diffraction grating having the light transmitting portions arranged with a pitch $\xi$,
   said pitch $\xi$ and said width d being set to satisfy a relation $1/10 \leq (d/\xi) \leq 2$.

2. The optical movement measuring method as claimed in claim 1 wherein said light transmitting portions have a width $\delta$ which is small compared to said pitch $\xi$.

3. The optical movement measuring method as claimed in claim 1 wherein said step of detecting the interference fringes detects overlapping spots of diffracted lights of nth and mth orders of diffraction, said length d is equal to $|1/(n-m)| \cdot \xi$, and said bright portions of said interference fringes have a period $\xi'$ which is equal to $|1/(m-n)| \cdot (1 + b_2/b_1) \cdot \xi$, where $b_1$ denotes a distance between said light source and said diffraction grating and $b_2$ denotes a distance between said diffraction grating and a detecting position where said overlapping spots of diffracted light are generated.

4. The optical movement measuring method as claimed in claim 1 wherein said step of detecting the interference fringes detects overlapping spots of diffracted lights of zeroth and one of $\pm 1$st orders of diffraction, said length d is approximately equal to $\xi$, and said bright portions of said interference fringes have a period $\xi'$ which is equal to $(1 + b_2/b_1) \cdot \xi$, where $b_1$ denotes a distance between said light source and said diffraction grating and $b_2$ denotes a distance between said diffraction grating and a detecting position where said overlapping spots of diffracted lights are generated.

5. The optical movement measuring method as claimed in claim 1 wherein said step of detecting the interference fringes detects overlapping spots of diffracted lights of $\pm 1$st orders of diffraction, said length d is approximately equal to $\xi/2$, and said bright portions of said interference fringes have a period $\xi'$ which is equal to $(\frac{1}{2}) \cdot (1 + b_2/b_1) \cdot \xi$, where $b_1$ denotes a distance between said light source and said diffraction grating and $b_2$ denotes a distance between said diffraction grating and a detecting position where said overlapping spots of diffracted light are generated.

6. The optical movement measuring method as claimed in claim 1 wherein said step of detecting the interference fringes detects overlapping spots of diffracted lights of ±nth orders of diffraction, said length d is approximately equal to $\xi/2n$, and said bright portions of said interference fringes have a period $\xi'$ which is equal to $(\frac{1}{2}n)\cdot(1+b2/b1)\cdot\xi$, where b1 denotes a distance between said light source and said diffraction grating and b2 denotes a distance between said diffraction grating and a detecting position where said overlapping spots of diffracted light are generated.

7. The optical movement measuring method as claimed in claim 1 wherein said step of irradiating the light uses a divergent light, said diffraction grating is arranged linearly on the object, and said step of measuring the movement measures a linear movement of the object.

8. The optical movement measuring method as claimed in claim 1 wherein said diffraction grating is arranged in a circular pattern on the object, and said step of measuring the movement measures a rotary movement of the object.

9. The optical movement measuring method as claimed in claim 8 wherein said step of irradiating the light uses a divergent light, said diffraction grating is arranged in a circular pattern on a surface of the object which is a disk, and said step of measuring the movement measures a rotary movement of the disk.

10. The optical movement measuring method as claimed in claim 8 wherein said diffraction grating is arranged in a circular pattern on a peripheral surface of the object which is a cylinder, and said step of measuring the movement measures a rotary movement of the cylinder.

11. An optical movement measuring method for measuring a movement of an object, said optical movement measuring method comprising the steps of:
  irradiating a light from a light source on a diffraction grating which is provided on the object so as to generate diffracted lights of different orders of diffraction, said diffraction grating having light reflecting portions and non-reflecting portions which are alternately and periodically arranged;
  detecting interference fringes which are generated by overlapping spots of diffracted lights of two mutually different orders of diffraction, said interference fringes comprising bright and dark stripes which occur alternately; and
  measuring a movement of the object based on a counted number of stripes of the detected interference fringes,
  said step of irradiating the light using a light which is emitted from a finite line source which has a length d,
  said diffraction grating having the light reflecting portions arranged with a pitch $\xi$,
  said pitch $\xi$ and said width d being set to satisfy a relation $1/10 \leq (d/\xi) \leq 2$.

12. The optical movement measuring method as claimed in claim 11 wherein said light reflecting portions have a width $\delta$ which is small compared to said pitch $\xi$.

13. The optical movement measuring method as claimed in claim 11 wherein said step of detecting the interference fringes detects overlapping spots of diffracted lights of nth and mth orders of diffraction, said length d is equal to $|1/(n-m)|\cdot\xi$, and said bright portions of said interference fringes have a period $\xi'$ which is equal to $|1/(m-n)|\cdot(1+b2/b1)\cdot\xi$, where b1 denotes a distance between said light source and said diffraction grating and b2 denotes a distance between said diffraction grating and a detecting position where said overlapping spots of diffracted light are generated.

14. The optical movement measuring method as claimed in claim 11 wherein said step of detecting the interference fringes detects overlapping spots of diffracted lights of zeroth and one of ±1st orders of diffraction, said length d is approximately equal to $\xi$, and said bright portions of said interference fringes have a period $\xi'$ which is equal to $(1+b2/b1)\cdot\xi$, where b1 denotes a distance between said light source and said diffraction grating and b2 denotes a distance between said diffraction grating and a detecting position where said overlapping spots of diffracted lights are generated.

15. The optical movement measuring method as claimed in claim 11 wherein said step of detecting the interference fringes detects overlapping spots of diffracted lights of ±1st orders of diffraction, said length d is approximately equal to $\xi/2$, and said bright portions of said interference fringes have a period $\xi'$ which is equal to $(\frac{1}{2})\cdot(1+b2/b1)\cdot\xi$, where b1 denotes a distance between said light source and said diffraction grating and b2 denotes a distance between said diffraction grating and a detecting position where said overlapping spots of diffracted light are generated.

16. The optical movement measuring method as claimed in claim 11 wherein said step of detecting the interference fringes detects overlapping spots of diffracted lights of ±nth orders of diffraction, said length d is approximately equal to $\xi/2n$, and said bright portions of said interference fringes have a period $\xi'$ which is equal to $(\frac{1}{2}n)-(1+b2/b1)\cdot\xi$, where b1 denotes a distance between said light source and said diffraction grating and b2 denotes a distance between said diffraction grating and a detecting position where said overlapping spots of diffracted light are generated.

17. The optical movement measuring method as claimed in claim 11 wherein said step of irradiating the light uses a divergent light, said diffraction grating is arranged linearly on the object, and said step of measuring the movement measures a linear movement of the object.

18. The optical movement measuring method as claimed in claim 11 wherein said diffraction grating is arranged in a circular pattern on the object, and said step of measuring the movement measures a rotary movement of the object.

19. The optical movement measuring method as claimed in claim 18 wherein said step of irradiating the light uses a divergent light, said diffraction grating is arranged in a circular pattern on a surface of the object which is a disk, and said step of measuring the movement measures a rotary movement of the disk.

20. The optical movement measuring method as claimed in claim 18 wherein said diffraction grating is arranged in a circular pattern on a peripheral surface of the object which is a cylinder, and said step of measuring the movement measures a rotary movement of the cylinder.

21. An optical movement measuring apparatus for measuring a movement of an object, said optical movement measuring apparatus comprising:
  a light source for emitting a light;
  a diffraction grating which is provided on the object so as to generate diffracted lights of different orders of diffraction when irradiated by the light emitted from said light source, said diffraction grating having light transmitting portions and light blocking portions which are alternately and periodically arranged;

detector means for detecting interference fringes which are generated by overlapping spots of diffracted lights of two mutually different orders of diffraction, said interference fringes comprising bright and dark stripes which occur alternately; and means responsive to an output of said detector means for measuring a movement of the object based on a counted number of stripes of the detected interference fringes, said light source being constituted by a finite line source which has a length d and emits a light, said diffraction grating having the light transmitting portions arranged with a pitch $\xi$, said pitch $\xi$ and said width d being set to satisfy a relation $1/10 \leq (d/\xi) \leq 2$.

22. The optical movement measuring apparatus as claimed in claim 21 wherein said light transmitting portions have a width $\delta$ which is small compared to said pitch $\xi$.

23. The optical movement measuring apparatus as claimed in claim 21 wherein said detector means detects overlapping spots of diffracted lights of nth and mth orders of diffraction, said length d is equal to $|1/(n-m)| \cdot \xi$, and said bright portions of said interference fringes have a period $\xi'$ which is equal to $|1/(m-n)| \cdot (1+b2/b1) \cdot \xi$, where b1 denotes a distance between said light source and said diffraction grating and b2 denotes a distance between said diffraction grating and a detecting position where said overlapping spots of diffracted light are generated.

24. The optical movement measuring apparatus as claimed in claim 21 wherein said detector means detects overlapping spots of diffracted lights of zeroth and one of ±1st orders of diffraction, said length d is approximately equal to $\xi$, and said bright portions of said interference fringes have a period $\xi'$ which is equal to $(1+b2/b1) \cdot \xi$, where b1 denotes a distance between said light source and said diffraction grating and b2 denotes a distance between said diffraction grating and a detecting position where said overlapping spots of diffracted lights are generated.

25. The optical movement measuring apparatus as claimed in claim 21 wherein said detector means detects overlapping spots of diffracted lights of ±1st orders of diffraction, said length d is approximately equal to $\xi/2$, and said bright portions of said interference fringes have a period $\xi'$ which is equal to $(\frac{1}{2}) \cdot (1+b2/b1) \cdot \xi$, where b1 denotes a distance between said light source and said diffraction grating and b2 denotes a distance between said diffraction grating and a detecting position where said overlapping spots of diffracted light are generated.

26. The optical movement measuring apparatus as claimed in claim 21 wherein said detector means detects overlapping spots of diffracted lights of ±nth orders of diffraction, said length d is approximately equal to $\xi/2n$, and said bright portions of said interference fringes have a period $\xi'$ which is equal to $(\frac{1}{2}n) \cdot (1+b2/b1) \cdot \xi$, where b1 denotes a distance between said light source and said diffraction grating and b2 denotes a distance between said diffraction grating and a detecting position where said overlapping spots of diffracted light are generated.

27. The optical movement measuring apparatus as claimed in claim 21 wherein said light source emits a divergent light, said diffraction grating is arranged linearly on the object, and said means for measuring the movement measures a linear movement of the object.

28. The optical movement measuring apparatus as claimed in claim 21 wherein said diffraction grating is arranged in a circular pattern on the object, and said means for measuring the movement measures a rotary movement of the object.

29. The optical movement measuring apparatus as claimed in claim 28 wherein said light source emits a divergent light, said diffraction grating is arranged in a circular pattern on a surface of the object which is a disk, and said means for measuring the movement measures a rotary movement of the disk.

30. The optical movement measuring apparatus as claimed in claim 28 wherein said diffraction grating is arranged in a circular pattern on a peripheral surface of the object which is a cylinder, and said means for measuring the movement measures a rotary movement of the cylinder.

31. An optical movement measuring apparatus for measuring a movement of an object, said optical movement measuring apparatus comprising:

a light source for emitting a light;

a diffraction grating which is provided on the object so as to generate diffracted lights of different orders of diffraction when irradiated by the light emitted from said light source, said diffraction grating having light reflecting portions and non-reflecting portions which are alternately and periodically arranged;

detector means for detecting interference fringes which are generated by overlapping spots of diffracted lights of two mutually different orders of diffraction, said interference fringes comprising bright and dark stripes which occur alternately; and means responsive to an output of said detector means for measuring a movement of the object based on a counted number of stripes of the detected interference fringes, said light source being constituted by a finite line source which has a length d and emits a light, said diffraction grating having the light reflecting portions arranged with a pitch $\xi$, said pitch $\xi$ and said width d being set to satisfy a relation $1/10 \leq (d/\xi) \leq 4$.

32. The optical movement measuring apparatus as claimed in claim 31 wherein said light reflecting portions have a width $\delta$ which is small compared to said pitch $\xi$.

33. The optical movement measuring apparatus as claimed in claim 31 wherein said detector means detects overlapping spots of diffracted lights of nth and mth orders of diffraction, said length d is equal to $|1/(n-m)| \cdot \xi$, and said bright portions of said interference fringes have a period $\xi'$ which is equal to $|1/(m-n)| \cdot (1+b2/b1) \cdot \xi$, where b1 denotes a distance between said light source and said diffraction grating and b2 denotes a distance between said diffraction grating and a detecting position where said overlapping spots of diffracted light are generated.

34. The optical movement measuring apparatus as claimed in claim 31 wherein said detector means detects overlapping spots of diffracted lights of zeroth and one of ±1st orders of diffraction, said length d is approximately equal to $\xi$, and said bright portions of said interference fringes have a period $\xi'$ which is equal to $(1+b2/b1)\cdot\xi$, where b1 denotes a distance between said light source and said diffraction grating and b2 denotes a distance between said diffraction grating and a detecting position where said overlapping spots of diffracted lights are generated.

35. The optical movement measuring apparatus as claimed in claim 31 wherein said detector means detects overlapping spots of diffracted lights of ±1st orders of diffraction, said length d is approximately equal to $\xi/2$, and said bright portions of said interference fringes have a period $\xi'$ which is equal to $(\frac{1}{2})\cdot(1+b2/b1)\cdot\xi$, where b1 denotes a distance between said light source and said diffraction grating and b2 denotes a distance between said diffraction grating and a detecting position where said overlapping spots of diffracted light are generated.

36. The optical movement measuring apparatus as claimed in claim 31 wherein said detector means detects overlapping spots of diffracted lights of ±nth orders of diffraction, said length d is approximately equal to $\xi/2n$, and said bright portions of said interference fringes have a period $\xi'$ which is equal to $(\frac{1}{2}n)\cdot(1+b2/b1)\cdot\xi$, where b1 denotes a distance between said light source and said diffraction grating and b2 denotes a distance between said diffraction grating and a detecting position where said overlapping spots of diffracted light are generated.

37. The optical movement measuring apparatus as claimed in claim 31 wherein said light source emits a divergent light, said diffraction grating is arranged linearly on the object, and said means for measuring the movement measures a linear movement of the object.

38. The optical movement measuring apparatus as claimed in claim 31 wherein said diffraction grating is arranged in a circular pattern on the object, and said means for measuring the movement measures a rotary movement of the object.

39. The optical movement measuring apparatus as claimed in claim 38 wherein said light source emits a divergent light, said diffraction grating is arranged in a circular pattern on a surface of the object which is a disk, and said means for measuring the movement measures a rotary movement of the disk.

40. The optical movement measuring apparatus as claimed in claim 38 wherein said diffraction grating is arranged in a circular pattern on a peripheral surface of the object which is a cylinder, and said means for measuring the movement measures a rotary movement of the cylinder.

41. The optical movement measuring method as claimed in claim 1, wherein the light transmitting portions and the light blocking portions of said diffraction grating are arranged in a direction which is parallel to a longitudinal direction of said light source.

42. The optical movement measuring method as claimed in claim 1, wherein said step of detecting the interference fringes detects overlapping spots of diffracted lights of nth and (n+1)th orders of diffraction.

43. The optical movement measuring method as claimed in claim 11, wherein the light reflecting portions and the non-reflecting portions of said diffraction grating are arranged in a direction which is parallel to a longitudinal direction of said light source.

44. The optical movement measuring method as claimed in claim 11, wherein said step of detecting the interference fringes detects overlapping spots of diffracted lights of nth and (n+1)th orders of diffraction.

45. The optical movement measuring apparatus as claimed in claim 21, wherein the light transmitting portions and the light blocking portions of said diffraction grating are arranged in a direction which is parallel to a longitudinal direction of said light source.

46. The optical movement measuring apparatus as claimed in claim 21, wherein said detector means detects overlapping spots of diffracted lights of nth and (n+1)th orders of diffraction.

47. The optical movement measuring apparatus as claimed in claim 31, wherein the light reflecting portions and the non-reflecting portions of said diffraction grating are arranged in a direction which is parallel to a longitudinal direction of said light source.

48. The optical movement measuring apparatus as claimed in claim 31, wherein said detector means detects overlapping spots of diffracted lights of nth and (n+1)th orders of diffraction.

49. An optical movement measuring method for measuring a movement of an object, said optical movement measuring method comprising the steps of:
- irradiating a light from a finite light source on a diffraction grating which is provided on the object so as to generate diffracted lights of different orders of diffraction, said diffraction grating having light transmitting portions and light blocking portions which are alternately and periodically arranged;
- detecting interference fringes which are generated by overlapping spots of diffracted lights of two mutually different orders of diffraction, said interference fringes comprising bright and dark stripes which occur alternately;
- arranging fixed diffraction gratings having a plurality of slits with a pitch $\xi'=(1+b2/b1)\cdot\xi$ at positions in the vicinity of sensors between the diffraction grating and said sensors;
- and simultaneously detecting, within an interference region of diffracted light of two mutually different orders of diffraction a plurality of interference fringes passing through the slits of the fixed diffraction gratings;
- measuring a movement of the object based on a counted number of stripes of the detected interference fringes; and
- wherein the width of the light source is d and the pitch $\xi$ and the width d have the relationship $1/10 \leq (d/\xi) \leq 2$.

50. An optical movement measuring method for measuring a movement of an object, said optical movement measuring method comprising the steps of:
- irradiating a light from a finite light source on a diffraction grating which is provided on the object so as to generate diffracted lights of different orders of diffraction, said diffraction grating having light reflecting portions and non-reflecting portions which are alternately and periodically arranged;
- detecting interference fringes which are generated by overlapping spots of diffracted lights of two mutually different orders of diffraction, said interference fringes comprising bright and dark stripes which occur alternately;
- arranging fixed diffraction gratings having a plurality of slits with a pitch $\xi'=(1+b2/b1)\cdot\xi$ at positions in the vicinity of sensors between the diffraction grating and said sensors;
- and simultaneously detecting, within an interference region of diffracted light of two mutually different orders of diffraction a plurality of interference fringes passing through the slits of the fixed diffraction gratings;

measuring a movement of the object based on a counted number of stripes of the detected interference fringes; and wherein the width of the light source is d and the pitch $\xi$ and the width d have the relationship $1/10 \leq (d/\xi) \leq 2$.

51. An optical movement measuring apparatus for measuring a movement of an object, said optical movement measuring apparatus comprising:

a finite light source for emitting a light; a diffraction grating which is provided on the object so as to generate diffracted lights of different orders of diffraction when irradiated by the light emitted from said light source, said diffraction grating having light transmitting portions and light blocking portions which are alternately and periodically arranged;

detector means for detecting interference fringes which are generated by overlapping spots of diffracted lights of two mutually different orders of diffraction, said interference fringes comprising bright and dark stripes which occur alternately;

a fixed diffraction grating having a plurality of slits with a pitch $\xi' = (1+b2/b1)\cdot\xi$ arranged at positions in a vicinity of said detectors such that a plurality of interference fringes passing through the slits of the fixed diffraction grating are simultaneously detected by said detector means, within an interference region of diffracted light of two mutually different orders of diffraction;

means responsive to an output of said detector means for measuring a movement of the object based on a counted number of stripes of the detected interference fringes; and wherein the width of the light source is d and the pitch $\xi$ and the width d have the relationship $1/10 \leq (d/\xi) \leq 2$.

52. An optical movement measuring apparatus for measuring a movement of an object, said optical movement measuring apparatus comprising:

a finite light source for emitting a light;

a diffraction grating which is provided on the object so as to generate diffracted lights of different orders of diffraction when irradiated by the light emitted from said light source, said diffraction grating having light reflecting portions and non-reflecting portions which are alternately and periodically arranged;

detector means for detecting interference fringes which are generated by overlapping spots of diffracted lights of two mutually different orders of diffraction, said interference fringes comprising bright and dark stripes which occur alternately;

a fixed diffraction grating having a plurality of slits with a pitch $\xi' = (1+b2/b1)\cdot\xi$ arranged at positions in a vicinity of said detectors such that a plurality of interference fringes passing through the slits of the fixed diffraction grating are simultaneously detected by said detector means, within an interference region of diffracted light of two mutually different orders of diffraction;

means responsive to an output of said detector means for measuring a movement of the object based on a counted number of stripes of the detected interference fringes; and wherein the width of the light source is d and the pitch $\xi$ and the width d have the relationship $1/10 \leq (d/\xi) \leq 2$.

53. An optical movement measuring method for measuring a movement of an object, said optical movement measuring method comprising the steps of:

irradiating a light from a finite light source on a diffraction grating which is provided on the object so as to generate diffracted lights of different orders of diffraction, said diffraction grating having light transmitting portions and light blocking portions which are alternately and periodically arranged;

detecting interference fringes which are generated by overlapping spots of diffracted lights of two mutually different orders of diffraction, said interference fringes comprising bright and dark stripes which occur alternately;

arranging fixed diffraction gratings having a plurality of slits with a pitch $\xi' = (1+b2/b1)\cdot\xi$ at positions in the vicinity of sensors between the diffraction grating and said sensors;

and simultaneously detecting, within an interference region of diffracted light of two mutually different orders of diffraction a plurality of interference fringes passing through the slits of the fixed diffraction gratings; and measuring a movement of the object based on a counted number of stripes of the detected interference fringes;

wherein the divergence angle from said light and the diffraction angle satisfies the relationship of $S/4 \leq \gamma \leq 3S/2$; and wherein the width of the light source is d and the pitch $\xi$ and the width d have the relationship $1/10 \leq (d/\xi) \leq 2$.

54. An optical movement measuring method for measuring a movement of an object, said optical movement measuring method comprising the steps of:

irradiating a light from a finite light source on a diffraction grating which is provided on the object so as to generate diffracted lights of different orders of diffraction, said diffraction grating having light reflecting portions and non-reflecting portions which are alternately and periodically arranged;

detecting interference fringes which are generated by overlapping spots of diffracted lights of two mutually different orders of diffraction, said interference fringes comprising bright and dark stripes which occur alternately;

arranging fixed diffraction gratings having a plurality of slits with a pitch $\xi' = (1+b2/b1)\cdot\xi$ at positions in the vicinity of sensors between the diffraction grating and said sensors;

and simultaneously detecting, within an interference region of diffracted light of two mutually different orders of diffraction a plurality of interference fringes passing through the slits of the fixed diffraction gratings; and measuring a movement of the object based on a counted number of stripes of the detected interference fringes;

wherein the divergence angle from said light and the diffraction angle satisfies the relationship of $S/4 \leq \gamma \leq 3S/2$; and wherein the width of the light source is d and the pitch $\xi$ and the width d have the relationship $1/10 \leq (d/\xi) \leq 2$.

55. An optical movement measuring apparatus for measuring a movement of an object, said optical movement measuring apparatus comprising:

a finite light source for emitting a light; a diffraction grating which is provided on the object so as to generate diffracted lights of different orders of diffraction when irradiated by the light emitted from said light source, said diffraction grating having light transmitting portions and light blocking portions which are alternately and periodically arranged;

detector means for detecting interference fringes which are generated by overlapping spots of diffracted lights of two mutually different orders of diffraction, said interference fringes comprising bright and dark stripes which occur alternately;

a fixed diffraction grating having a plurality of slits with a pitch $\xi'=(1+b2/b1)\cdot\xi$ arranged at positions in a vicinity of said detectors such that a plurality of interference fringes passing through the slits of the fixed diffraction grating are simultaneously detected by said detector means, within an interference region of diffracted light of two mutually different orders of diffraction; and means responsive to an output of said detector means for measuring a movement of the object based on a counted number of stripes of the detected interference fringes;

wherein the divergence angle from said light and the diffraction angle satisfies the relationship of $S/4 \leq \gamma\Sigma \leq 3S/2$; and wherein the width of the light source is d and the pitch $\xi$ and the width d have the relationship $1/10 \leq (d/\xi) \leq 2$.

56. An optical movement measuring apparatus for measuring a movement of an object, said optical movement measuring apparatus comprising:

a finite light source for emitting a light; a diffraction grating which is provided on the object so as to generate diffracted lights of different orders of diffraction when irradiated by the light emitted from said light source, said diffraction grating having light reflecting portions and non-reflecting portions which are alternately and periodically arranged;

detector means for detecting interference fringes which are generated by overlapping spots of diffracted lights of two mutually different orders of diffraction, said interference fringes comprising bright and dark stripes which occur alternately;

a fixed diffraction grating having a plurality of slits with a pitch $\xi'=(1+b2/b1)\cdot\xi$ arranged at positions in a vicinity of said detectors such that a plurality of interference fringes passing through the slits of the fixed diffraction grating are simultaneously detected by said detector means, within an interference region of diffracted light of two mutually different orders of diffraction; and means responsive to an output of said detector means for measuring a movement of the object based on a counted number of stripes of the detected interference fringes;

wherein the divergence angle from said light and the diffraction angle satisfies the relationship of $S/4 \leq \gamma \leq 3S/2$; and wherein the width of the light source is d and the pitch $\xi$ and the width d have the relationship $1/10 \leq (d/\xi) \leq 2$.

57. A method as in claim 49 further comprising the step of:
controlling the phase difference of the detection signals by adjusting the position of the fixed diffraction grating in a direction parallel to the moving direction of the diffraction grating.

58. A method as in claim 50 further comprising the step of:
controlling the phase difference of the detection signals by adjusting the position of the fixed diffraction grating in a direction parallel to the moving direction of the diffraction grating.

59. An apparatus as in claim 51 further comprising:
adjusting means for adjusting the position of the fixed diffraction gratings in a direction parallel to the moving direction of said diffraction gratings such that the phase difference of the detection signals is controlled.

60. An apparatus as in claim 52 further comprising:
adjusting means for adjusting the position of the fixed diffraction gratings in a direction parallel to the moving direction of said diffraction gratings such that the phase difference of the detection signals is controlled.

61. A method as in claim 53 further comprising the step of:
controlling the phase difference of the detection signals by adjusting the position of the fixed diffraction grating in a direction parallel to the moving direction of the diffraction grating.

62. A method as in claim 54 further comprising the step of:
controlling the phase difference of the detection signals by adjusting the position of the fixed diffraction grating in a direction parallel to the moving direction of the diffraction grating.

63. An apparatus as in claim 55 further comprising:
adjusting means for adjusting the position of the fixed diffraction gratings in a direction parallel to the moving direction of said diffraction gratings such that the phase difference of the detection signals is controlled.

64. An apparatus as in claim 56 further comprising:
adjusting means for adjusting the position of the fixed diffraction gratings in a direction parallel to the moving direction of said diffraction gratings such that the phase difference of the detection signals is controlled.

* * * * *